United States Patent [19]
Paleologou et al.

[11] Patent Number: 5,567,293
[45] Date of Patent: Oct. 22, 1996

[54] ELECTROMEMBRANE PROCESSES FOR THE TREATMENT OF KRAFT MILL ELECTROSTATIC PRECIPITATOR CATCH

[75] Inventors: Michael Paleologou, Pierrefonds; Richard M. Berry, Ile Perrot; Rokhsareh Thompson, Pointe Claire; James T. Wearing, Vancouver, all of Canada

[73] Assignee: Pulp and Paper Research Institute of Canada, Pointe-Claire, Canada

[21] Appl. No.: 362,200

[22] Filed: Dec. 22, 1994

[51] Int. Cl.⁶ .................................................. B01D 61/44
[52] U.S. Cl. .................... 204/523; 204/529; 204/531; 204/534; 204/537; 204/538; 204/539
[58] Field of Search ........................ 204/182.4, 182.5, 204/301, 151, 523, 529, 531, 534, 537, 538, 539

[56] References Cited

U.S. PATENT DOCUMENTS

| | | | |
|---|---|---|---|
| 3,654,125 | 4/1972 | Leitz et al. | 204/301 |
| 3,673,067 | 6/1972 | Harwood et al. | 204/182.3 |
| 3,746,612 | 7/1973 | Rapson et al. | 162/17 |
| 3,787,304 | 1/1974 | Chlanda et al. | 204/182.4 |
| 3,833,462 | 9/1974 | Moy et al. | 162/29 |
| 3,909,344 | 9/1975 | Lukes | 162/19 |
| 3,926,759 | 12/1975 | Horn et al. | 204/182.4 |
| 3,933,610 | 1/1976 | Ehara et al. | 204/182.5 |
| 3,945,880 | 3/1976 | Lukes et al. | 162/17 |
| 3,954,552 | 5/1976 | Lukes et al. | 162/17 |
| 3,996,097 | 12/1976 | Fuller | 162/30 K |
| 4,000,034 | 12/1976 | deVere Partridge et al. | 162/30 K |
| 4,082,835 | 4/1978 | Chlanda et al. | 423/242 |
| 4,107,264 | 8/1978 | Nagasubramanian et al. | 423/81 |
| 4,207,157 | 6/1980 | Hirai et al. | 204/182.4 |
| 4,325,792 | 4/1982 | Vaughan | 204/151 |
| 4,391,680 | 7/1983 | Mani et al. | 204/98 |
| 4,504,373 | 3/1985 | Mani et al. | 204/182.4 |
| 4,592,817 | 6/1986 | Chlanda et al. | 204/182.4 |
| 4,715,939 | 12/1987 | Ball et al. | 204/182.4 |
| 4,717,450 | 1/1988 | Shaw et al. | 162/29 |
| 5,415,751 | 5/1995 | Adachi et al. | 204/182.4 |

OTHER PUBLICATIONS

Backman, R. et al. Tappi Journal, 70:6, 123–127, (1987 Jun.) Fouling & Corrosion Mechanisms in the Recovery Boiler Superheater Area.

(List continued on next page.)

*Primary Examiner*—Arun S. Phasge
*Attorney, Agent, or Firm*—Swabey Ogilvy Renault

[57] ABSTRACT

A process for the recovery of alkali metal hydroxide and acid from the alkali metal salts of monovalent anions which are mixed with the alkali metal salts of multivalent anions employs a water-splitting system composed of bipolar membranes in conjunction with ion-selective membranes; a two-compartment cell employs monovalent anion-selective membranes to define salt/base and acid compartments with the bipolar membranes, and a three-compartment cell employs, monovalent anion-selective and cation-selective membranes to define with the bipolar membranes, acid, salt and base compartments; the process has particular applicability to the conversion of the sodium/potassium chloride portion of the Electrostatic Precipitator (ESP) Catch of the recovery boiler of coastal and/or closed-cycle kraft pulp mills, a mixture of mostly sodium/potassium sulphate and chloride, into sodium/potassium hydroxide and hydrochloric acid; the remaining sodium/potassium sulphate solution, depleted in chloride, can thus be used as sodium/sulphur make-up to the recovery cycle or converted to sulphuric acid and sodium/potassium hydroxide; a simpler version of the process, can be employed for the electrodialytic separation of ESP catch into its component sodium chloride and sodium sulphate; when a three-compartment water-splitting or electrodialysis system is used, potassium ions are preferentially removed from the feed compartment, over sodium, thus removing this undesirable non-process element from the alkali metal sulphate portion which is returned to the recovery cycle; there is also described approaches through which a partially or totally effluent free (TEF) kraft pulp mill can be achieved in terms of the elements sodium, sulphur and chlorine.

30 Claims, 6 Drawing Sheets

OTHER PUBLICATIONS

Skrifvars, B.-J. et al., Tappi Journal, 74:6, 185–189, (1991 Jun.) Composition of Recovery Boiler Dust & Its Effect on Sintering.

Blackwell, B. and Hitzroth, A., Proceedings of 1992 International Chemical Recovery Conference, pp. 329–350, Seattle, WA, Jun. 7–11, 1992.

Karjalainen et al., Pulp Paper Mag. Can. 73 (12), 95–101, (1972, Dec.) Chloride Buildup in Kraft Liquor Systems.

Wright, R. H. Pulp & Paper 31, 56–57, Mar. 1957 How to Eliminate Salt from Recovery Systems.

Rapson, W. H. Pulp Paper Mag. Can 68(12) T635–T640 (Dec. 1967), The Feasibility of Recovery of Bleach Plant Effluent to Elminate Water Pollution by Kraft Pulp Mills.

Rapson, W. H. Pulp Paper Mag. Can. 69(3), T161–T166, (1968 Mar.) "New Concepts for steam Improvement by Recovery of Bleach Plant liquors from Kraft Pulp Mills".

Belfer, S. et al., Reactive Polymers, 14:1, 81–84 (1991) "Immobilized resins and Liquid extractants for potassium extraction from concentrated brines."

Pichon, M. and Muratore, E. ATIP Rev. 31(9), 324–332, (1977 Nov.) Vers l'usine de Pate Kraft Blanchie sans effluent.

Collins, J. W. and Dallons, V. J. AlChE Symp. Ser 75:190 pp. 263–269, 1979 "Aspects of water reuse in the pulp & paper industry."

Christie, R. D. Proceedings of International Pulp Bleaching Conference, Toronto, Ont. pp. 197–200, Jun. 1979, Salt Removal Experience in McMillan Bloedel Ltd.

Venho J. et al. Proceedings of CPPA Envr. Improvement Conf. Montreal, Que pp. 41–47, Oct. 1976, Salt Removal Methods, Effects on Chloride Balances in closed kraft liquor systems.

Uloth, V. C. et al. Proceedings of Pacific Paper Expo, Vancouver, B. C. pp. 42–48, Dec. 1992.

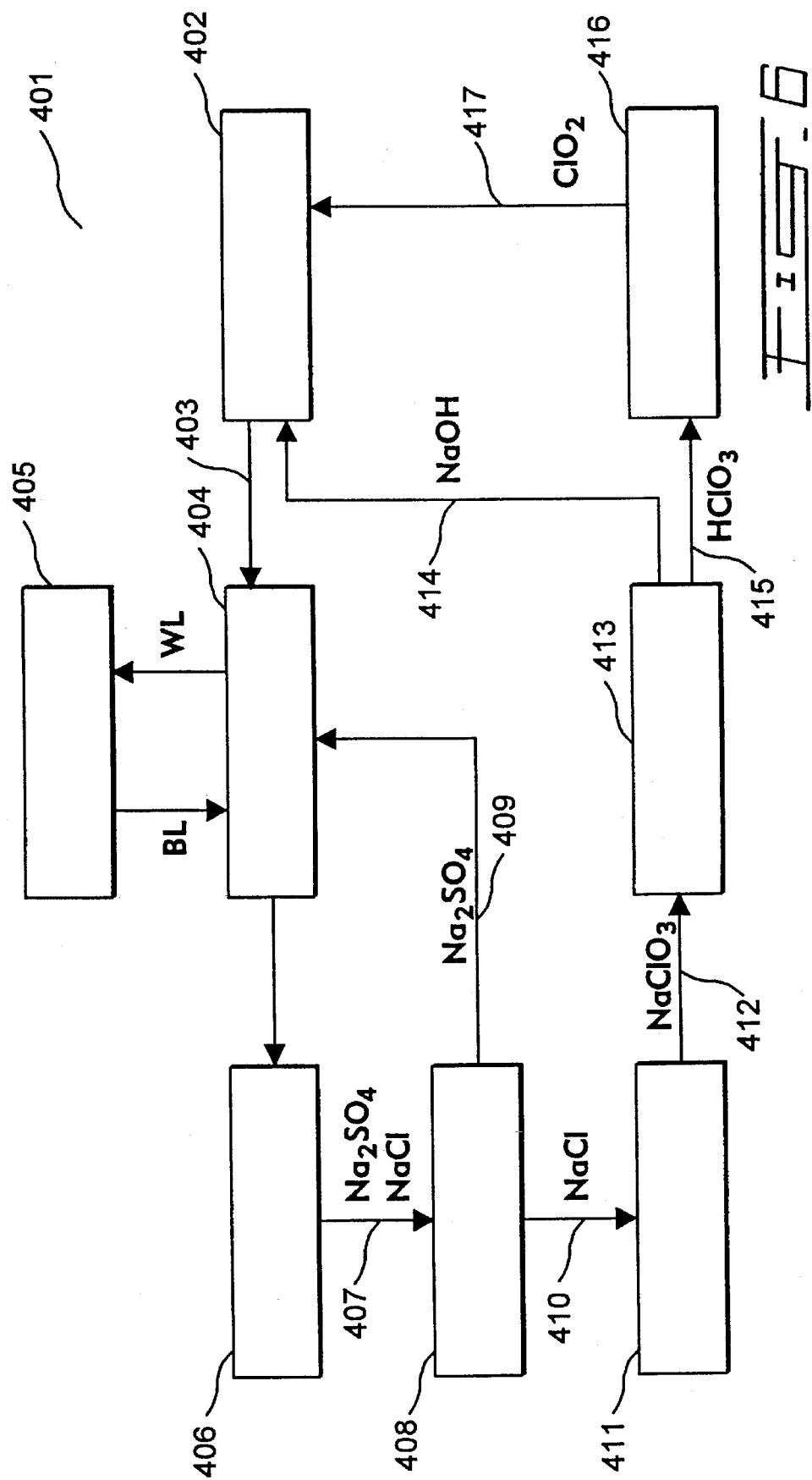

ELECTROMEMBRANE PROCESSES FOR THE TREATMENT OF KRAFT MILL ELECTROSTATIC PRECIPITATOR CATCH

BACKGROUND OF THE INVENTION (i) Field of the Invention

This invention is concerned with a process for the recovery of alkali metal hydroxide and acid from the alkali metal salts of monovalent anions which are mixed with the alkali metal salts of multivalent anions using a water-splitting system incorporating bipolar and ion-selective membranes. A simpler version of the process uses an electrodialysis system incorporating cation and anion-selective membranes, for the separation of salts of monovalent anions from the salts of multivalent anions.

More especially this invention relates to the removal of sodium and/or potassium chloride from the electrostatic precipitator (ESP) catch of coastal and/or closed-cycle kraft pulp mills (typically a mixture composed of mostly sodium/ potassium sulphate and chloride); and to the concurrent and/or subsequent splitting of such salts into their component acid and base.

This invention also describes approaches through which a partially or totally effluent free (TEF) kraft pulp mill can be achieved in terms of the elements, sodium, sulphur and chlorine.

(ii) Description of Prior Art

The accumulation of sodium chloride in the kraft recovery system, most notably in the particulate matter deposited on the heat-exchanger banks of the recovery boiler, is a problem for mills that use logs floated in sea water. High levels of chloride and potassium in the black liquor can result in low melting point deposits and consequently fire-side corrosion of the superheater tubes in the kraft recovery boiler. Chloride, potassium and sulphide act as melting point depressants and increase the plugging tendency and propensity for corrosion of superheater tubes, by forming a liquid phase in the deposited salt mixture on the tube surface (Backman, R. et al., Tappi Journal, 70:6, 123–127, 1987). The presence of both chloride and potassium can also significantly increase the sintering tendency of the boiler dust at temperatures as low as 400° C. (Skrifvars, B.-J. et al., Tappi Journal, 74:6, 185–189, 1991). To diminish these problems, a portion of the ESP catch is frequently sewered at coastal mills (that use logs floated in sea water) to control chloride levels in the recovery cycle. This control measure also causes a loss of sodium from the liquor cycle. This sodium must be replaced to maintain a mill's sodium/sulphur balance. The significance of this loss may be greater in the future in the case of kraft mills in which chlorine-containing oxidants continue to be used in the bleaching process and bleach plant filtrates are recycled to the kraft recovery cycle (Blackwell, B. and Hitzroth, A., Proceedings of 1992 International Chemical Recovery Conference, pp. 329–350, Seattle, Wash. Jun. 7–11, 1992). It is also possible that potassium and chloride might accumulate in the recovery system of closed-cycle mills employing. TCF (totally chlorine free) bleaching sequences since small amounts of these elements are found in wood and/or process chemicals (e.g. sodium hydroxide).

The factors influencing chloride build-up in the recovery cycle of coastal kraft pulp mills were previously defined (Karjalainen et al., Pulp Paper Mag- Can., 73 (12), 95–101, 1972). These investigators examined the influence of various factors upon the equilibrium concentration of sodium chloride in alkaline pulping liquor and suggested that a simple bleed be used to control the concentration. Various other approaches that can be used to eliminate chloride salts from recovery systems include: processes depending on phase equilibria, chemical precipitation, ion-exchange, electrolytic action, diffusion, and processes involving the removal of chlorine as a gas (Wright, R. H., Pulp & Paper, 31, 56–57, March 1957). Another process recommended in the literature for the removal of chloride from the recovery cycle is one in which all soluble materials are washed out of both unbleached and bleached pulp by countercurrent washing followed by evaporation of all the wash water and burning of the combustible solids (Rapson, W. H., Pulp Paper Mag. Can., 68(12), T635T640, 1967; Rapson, W. H., Pulp Paper Mag. Can., 69(3), T161-T166, 1968). This approach, however, resulted in a high-capital, high-energy operation that produced only a cheap salt by-product. A number of other schemes have been developed to reduce chloride levels in spent cooking liquors from a pulp process, which involve crystallization. Such schemes are disclosed in U.S. Pat. Nos. 3,945,880 to Lukes et al., 3,909,344 to Lukes, 3,954,552 to Lukes et al., 3,746,612 to Rapson et al. and 3,833,462 to Moy et al. Such crystallization schemes involve some loss of active pulping chemicals, and cannot be economically retrofitted to existing mills. U.S. Patent Nos. 3,996,097 to Willard, and 4,000,034 to de Vere Partridge et al. on the other hand, disclose methods wherein chloride salts are removed from the ESP catch through different combinations of standard precipitation and crystallization techniques. These latter two methods require high residual chloride levels in the plant liquors to be effective. In addition, chloride-induced corrosion of the chloride removal equipment utilized in the latter two methods, has been identified as a problem of these approaches. An electrolytic system employing an anion-exchange membrane to remove chloride ion from black liquor was also proposed (Shaw, J. M. and Oloman, C. W., U.S. Pat. No. 4,717,450, Jan. 5, 1988). The problem with this system, however, is that the capital and operating costs are quite high and, furthermore, the anion-selective membrane is subject to fouling by the phenolic-type lignin fragments that are found in black liquor.

Potassium has not been considered to the same extent as chloride in the context of removal from the recovery cycle. However, methods of separation have been examined- The use of ion-exchange resins for potassium removal has been studied in the laboratory. A polystyrene resin impregnated with Cyanex 301 and a crown ether was used to separate potassium from sodium, magnesium and calcium (Belfer, S. et al., Reactive Polymers, 14:1, 81–84 (1991).

Many of the options for chloride and potassium removal have been used industrially. and their comparative performance has been reviewed in a number of papers (Pichon, M. and Muratore, E., ATIP Rev. 31(9), 324–332, 1977; Collins, J. W. and Dallons, V. J., AIChE Symp- Set. 75:190, pp. 263–269, 1979; Christie, R.D., Proceedings of International Pulp Bleaching Conference, Toronto, Ontario, pp. 197–200, June 1979; Venho, J. et al., Proceedings of CPPA Envr. Improvement Conf., Montreal, Quebec, pp. 41–47, October 1976; Uloth, V.C. et al., Proceedings of Pacific Paper Expo, Vancouver, B.C., pp. 42–48, December 1992). Of all options, leaching of sodium/potassium chloride from ESP catch appears to be the simplest and most economically competitive with the reference option of sewering (Blackwell, B. and Hitzroth, A., Proceedings of 1992 International Chemical Recovery Conference, pp. 329–350, Seattle, Wash. Jun. 7–11, 1992). A potential problem with this option is that appreciable quantities of sodium chloride may have to be present in the ESP catch for efficient leaching to take place.

It is desirable then, to have a cost-effective method of removing chloride and/or potassium from a process solution containing sulphate and other divalent ions., in particular from a solution of ESP catch from a kraft pulping process. Such a method should remove chloride in preference to sulphate and other di- or multivalent anions, so that the latter are not substantially depleted from the ESP catch solution, and are available for recycling to the pulping process. The process should also preferentially remove potassium from the ESP catch solution since high levels of potassium chloride in the black liquor can result in fire-side corrosion of the superheater tubes in the kraft recovery boiler. The process should also preferably be readily retrofitted to existing mills, and not result in severe corrosion problems in the equipment required, and should be capable of operating while maintaining low chloride and potassium levels in the pulp mill process solutions.

Membrane systems involving water splitters in the three-compartment configuration have been recommended for various applications. These include the recovery of fluorine values from fluorosilic acid aqueous streams by electrodialytic water splitting of fluoride salt to hydrofluoric acid and hydroxide base (U.S. Pat. No. 3,787,304 by Chlanda et al.), the recovery of $TiO_2$ from ilmenite-type ores by digestion, with hydrofluoric acid, in which hydrofluoric acid and ammonium hydroxide are recovered by an electrodialytic water-splitting process from by-product aqueous ammonium fluoride (U.S. Pat. No. 4,107,264 by Nagasubramanian and Liu), the conversion of alkali metal sulfate values, such as sodium or potassium values in spent rayon spin bath liquors, into alkali metal hydroxide and alkali metal sulfate/sulfuric acid (U.S. Pat. No. 4,504,373 by Mani and. Chlanda) and the recovery of metal or ammonium values from materials comprising a salt of a first acid while avoiding formation of gas bubbles in the water-splitting cells. Membrane systems involving water-splitters in the two-compartment configuration have been recommended in a number of applications. These include desalination (U.S. Pat. No. 3,654,125 to Leitz), springing of sulfur dioxide from aqueous sulphite and bisulfite solutions (U.S. Pat. No. 4,082,835 to Chlanda et al.), the removal of alkali metal cations from aqueous alkali metal chloride solutions so as to produce an acidified salt solution and sodium hydroxide (U.S. Pat. No. 4,391,680 to Mani and Chlanda) and the recovery of valuable metal or ammonium values from materials comprising a salt of a first acid while avoiding the formation of gas bubbles (U.S. Pat. No. 4,592,817 to Chlanda and Mani). Moreover, the removal of anions and cations from solutions by electrodialysis is well-documented in the literature (U.S. Patent Nos. 3,673,067, 3,926,759, 4,207,157 and 4,325,792 and 4,715,939).

In none of the aforementioned systems, however, is suggestion made for the application of such membrane systems to the partial or complete recovery of alkali metal hydroxide and acid from the alkali metal salts of monovalent anions which are mixed with the alkali metal salts of multivalent anions as is the case, for example, in kraft pulp mill ESP catch. Moreover, in none of the aforementioned systems is reference made to the electrodialytic separation of ESP catch into its sodium chloride and sodium sulphate components. Even though, when a water-splitting system is used with conventional ion-selective membranes, all the sodium/potassium in the ESP catch can be recovered as sodium/potassium hydroxide, the product acid would be a mixture of hydrochloric and sulphuric acids, and would be difficult to re-use in many mills. In addition, the lost sulphur may be needed to maintain the sodium/sulphur balance in the recovery cycle. By using a monovalent anion-selective membrane, the chloride portion of the ESP catch can be removed with its sodium/potassium value recovered as base. The sodium sulphate which is thus depleted in chloride can also be recovered and used as make-up to the recovery cycle.

Moreover, in none of the afore-mentioned systems is reference made to the integration of these systems into kraft pulp mill operations in terms of achieving a partially or totally effluent free (TEF) mill with respect to the elements sodium, sulphur and chlorine.

SUMMARY OF THE INVENTION

It is an object of this invention to provide a process for the recovery of alkali metal hydroxide and acid from the alkali metal salts of monovalent anions which are mixed with the alkali metal salts of multivalent anions using a water-splitting system incorporating bipolar, cation-selective and monovalent anion-selective membranes or simply bipolar and monovalent anion-selective membranes.

It is a further object of this invention to provide a process for the separation of the alkali metal salts of monovalent anions from the alkali metal Salts of multivalent anions using an electrodialysis system incorporating cation-selective and monovalent anion-selective membranes In accordance with the invention there is provided a process comprising: a) providing a cell comprising an anode, a cathode and at least two compartments therebetween separated by a monovalent anion-selective membrane, b) feeding an aqueous solution of a mixture of alkali metal salts of monovalent and polyvalent anions into a first of said compartments to contact a first side of said monovalent anion-selective membrane, c) feeding a liquid comprising water into a second of said compartments to contact a second side of said monovalent anion-selective membrane, d) passing a direct current through said cell between the anode and cathode, to effect migration of monovalent anions from said first compartment through said membrane into said second compartment, and e) recovering a solution of alkali metal salts of the polyvalent anions depleted in salts of the monovalent anions from said first compartment.

In accordance with the invention there is provided a process which comprises the steps of: (a) providing a cell comprising an anode, a cathode and at least three compartments therebetween defined at least in part by a monovalent anion-selective membrane, a cation-selective membrane and two bipolar membranes, said bipolar membranes having a cation-selective side facing said cathode and an anion-selective side facing said anode, (b) feeding an aqueous solution of a mixture of salts of monovalent (MA) and polyvalent anions ($M_xB$) into a first of said compartments to contact a first side of said cation-selective membrane and a first side of said anion-selective membrane wherein M is an alkali metal cation, A is a monovalent anion, B is a multivalent anion and x is the valency of the multivalent anion, (c) feeding liquid comprising water into a second of said compartments to contact a cation-selective side of a first of said bipolar membranes and a second side of said monovalent anion-selective membrane, (d) feeding liquid comprising water into a third of said compartments to contact an anion-selective side of a second of said bipolar membranes and a second side of said cation-selective membrane, (e) passing a direct current through said cell between the anode and cathode to effect: (i) migration of said monovalent anions B from said first compartment through said monovalent anion-selective membrane into said second compartment, and (ii) migration of said alkali metal cations M from said first compartment through said cation-selective membrane into said third compartment (iii) splitting of water by said bipolar membranes of said second and third compartments with accumulation of hydrogen ions of the water along with the monovalent anions, A, in said second compartments and accumulation of hydroxide ions of the water along with the alkali metal cations M, in said third compartment, (f) removing a solution depleted in MA but not $M_xB$ from said first compartment, (g) removing accumulated HA from said second compartment and (h) removing accumulated MOH from said third compartment.

In accordance with the invention there is also provided a process which comprises the steps of: (a) providing a cell comprising an anode, a cathode and at least two compartments therebetween defined at least in part by a monovalent anion-selective membrane and two bipolar membranes, said bipolar membranes having a cation-selective side facing said cathode and an anion-selective side facing said anode, (b) feeding an aqueous solution of a mixture of salts of monovalent (MA) and polyvalent anions ($M_xB$) into a first of said compartments to contact a first side of said anion-selective membrane and the anion-selective side of a first of said bipolar membranes, wherein M, A, B and x are as defined hereinbefore, (c) feeding liquid comprising water into a second of said compartments to contact the second side of said anion-selective membrane and the cation-selective side of a second of said bipolar membranes, (d) passing a direct current through said cell between the anode and cathode to effect: (i) migration of said monovalent anions A from said first compartment through said monovalent anion-selective membrane into said second compartment, and (ii) splitting of water by said bipolar membranes of said first and second compartments with accumulation of hydrogen ions along with the monovalent anions, A, in said second compartment and accumulation of hydroxide ions of the water in said first compartment, (e) removing accumulated HA from said second compartment, and (f) removing accumulated MOH from said first compartment mixed with undepleted $M_xB$.

In particular in this latter aspect of the invention step c) may additionally comprise feeding the liquid comprising water into a third compartment to contact an anion selective side of a first of the bipolar membranes.

In accordance with the invention there is also provided a process which comprises the steps of: (a) providing a cell comprising an anode, a cathode and at least two compartments therebetween defined at least in part by a monovalent anion-selective membrane and at least a pair of cation-selective membranes; (b) feeding an aqueous solution of a mixture of salts of monovalent (MA) and polyvalent anions ($M_xB$), wherein M, A, B and x are as defined hereinbefore, into a first of said compartments to contact a first side of said monovalent anion-selective membrane; (c) feeding liquid comprising water into a second of said compartments to contact the other side of said monovalent anion-selective membrane, (d) passing a direct current through said cell between the anode and cathode to effect: (i) migration of said monovalent anions, A from said first compartment through said monovalent anion-selective membrane into said second compartment, and (ii) migration of said alkali metal cations, M from said first compartment to said second compartment (e) removing accumulated MA from said second compartment, and (f) removing remaining $M_xB$ from said first compartment.

DESCRIPTION OF PREFERRED EMBODIMENTS (i) Solutions Treated

The aqueous solution containing monovalent and polyvalent anions may be a kraft pulp mill liquor or effluent stream, for example, black liquor, green liquor, white liquor, bleaching effluent or chlorine dioxide generator effluent.

The aqueous solution may also be a solution of the catch of the Electrostatic Precipitator (ESP) of a kraft pulp mill chemical recovery boiler. The ESP catch solution typically contains at least one alkali metal cation selected from sodium or potassium ions, chloride ions and sulphate ions and may also contain carbonate ions as well as various inorganic and organic impurities.

The ESP catch solution may be dissolved in water at the solubility limit of sodium sulphate or sodium chloride, at any given temperature, prior to pretreatment and subsequent introduction into an electromembrane system of the invention.

The electromembrane system of the invention may be a two- or three-compartment electrolysis cell, a two- compartment electrodialysis cell or a two- or three- compartment water-splitting cell.

(ii) Pre-treatment of ESP Catch

Besides chloride and potassium, ESP catch has a number of other impurities and a range of compositions which need to be considered before the proposed electromembrane processes can effectively compete with other processes for chloride and potassium removal from ESP catch. The composition of ESP catch from a coastal kraft pulp mill and a non-coastal kraft pulp mill, as determined by atomic absorption and ion chromatography, are shown in Table I. As expected, the chloride levels are higher in the ESP catch from the coastal mill than in a similar sample from a non-coastal kraft pulp mill. Table II shows the variation of the composition of the catch at one coastal mill over a five-month period. Sulphate and chloride levels varied, as did the amounts of potassium and iron. Somewhat surprising was the low level of carbonate in all samples. Presumably in the ESP catches sampled, sulphur dioxide and sulphur trioxide, which are formed in the recovery furnace when black liquor is burned, react with sodium carbonate to produce sodium sulphate. The reaction of hydrochloric acid in the flue gas with the carbonate to produce the corresponding chloride salt would also lower the carbonate content of the captured salt [Balasic, P.J., Pulp and Paper, 53(11), 154–159, 1979; Crowe, D.C., Proceedings of Tappi Engineering Conference, pp. 691–694, 1986.

Table II also shows that organic material is another component of the ESP catch. This component represented as much as 0.9% of the catch in the samples from the coastal mill. IR and UV analysis showed the typical aromatic absorptions of a lignin-derived material. The organic content of the ESP catch is a result of entrained black liquor droplets in the flue gas. Better furnace control in this coastal mill, through good air distribution, has now reduced the level of lignin to about 0.08%.

Based on these analyses, the potentially problematic components of a solution made from the ESP catch were identified to be: 1) the soluble multivalent metal ions which can form insoluble hydroxides when crossing the cation-selective membranes of the water-splitting system, and 2) the soluble organic material which could precipitate out in the acid environment within the anion-selective membranes (Paleologou et al., J. Pulp Pap. Sci., 18(4), 138–145, 1992). The problem of multivalent metal contamination might be eliminated by using monovalent cation selective-membranes while the amount of organic materials carried over in the ESP catch could be minimized by choosing suitable furnace operating conditions. These impurities require pretreatment of the ESP catch before introduction into any of the proposed electromembrane systems. In these applications, however, the problems arising from such cations, were minimized or eliminated, by:

(a) Dissolving the ESP catch in water and then filtering the resulting dark brown solution, (b) Shaking the solution with activated carbon to remove the organics, thereby producing a colourless filtrate, (c) Making the solution alkaline, using sodium hydroxide and/or carbonate to precipitate out the hydroxides and/or carbonates of the multivalent metals, (d) Shaking the solution again with activated carbon and filtering to remove the solids, and (e) Contacting the resulting solution with a chelating resin with aminophosphonic functional groups or paired iminodiacetate groups, or other functional groups for the removal of remaining multivalent ions and especially calcium ions.

The relative ratio of chloride/sulphate in the ESP catch (solid) is dictated by: the type and operational conditions of the kraft pulp mill chemical recovery boiler and its ESP, the wood species, the degree to which logs were floated in sea water, the amount of sodium/potassium chloride in the sodium hydroxide and other chemicals used at the pulp mill, and the degree of bleeding of ESP catch to control chloride and potassium levels. Depending on the way, however, in which ESP catch is dissolved in water, the chloride/sulphate ratio in the solution entering the proposed electromembrane systems will be different.

Before pre-treatment, the ESP catch can be dissolved in water in either one of two ways:

(i) at the solubility limit (saturation level) of sodium sulphate, or (ii) at the solubility limit (saturation level) of sodium chloride.

In case (i), the molar ratio of chloride to sulphate in solution will reflect the composition of ESP catch which for open coastal mills ranges from about 0.1 to 1.5 $Cl^-/SO_4^{2-}$. For open non-coastal mills this ratio ranges from about 0.01 to 0.05 $Cl^-/SO_4^{2-}$. However, with increasing closure of noncoastal mills this ratio is expected to increase to levels comparable to coastal mills at which point the need will arise for removing the excess chloride. Thus the ESP catch solution typically has a molar ratio of chloride to sulphate of 0.1 to 1.5, especially about 1.

In case (ii), the molar ratio of chloride to sulphate in solution would be as high as the ratio of solubilities of sodium chloride and sodium sulphate at a given temperature. At room temperature, this ratio is about 6/1.5=4. If one operates in this mode, a significant portion of the sodium/potassium sulphate (about 75%) will precipitate out in the dissolving tank. This sodium sulphate is expected to be fairly free of sodium chloride and, therefore, it can be returned to the recovery cycle in either the solid form or after being dissolved in water in a separate step.

Thus in this latter case the ESP catch solution typically has a molar ratio of chloride to sulphate of from 1.5 to 5 and especially 4.

Some advantages of operating at the solubility limit of sodium chloride as compared to the solubility limit of sodium sulphate are:

i) the conductivity of the feed solution will be higher and therefore the ohmic resistance and hence the voltage across the electro-membrane system used will be lower.

ii) the current efficiencies for sodium and chloride removal from the ESP catch will be higher due to the higher sodium and chloride concentrations in the feed compartment.

iii) the removal of organics during step (b) above, of the pre-treatment process, will be more efficient due to the high ionic strength of the feed solution.

TABLE I

|  | Non-Coastal Mill ESP Catch Composition, Wt % | Coastal Mill ESP Catch Composition, Wt % |
|---|---|---|
| Sodium | 30.0 | 30.2 |
| Potassium | 3.3 | 5.7 |
| Calcium | 0.009 | 0.004 |
| Iron | 0.007 | 0.060 |
| Manganese | 0.003 | 0.002 |
| Magnesium | 0.003 | 0.002 |
| Chromium | 0.002 | 0.002 |
| Nickel | ND | 0.003 |
| Copper | ND | ND |
| Aluminum | ND | <0.010 |
| Lead | <0.005 | ND |
| Sulphate | 63.5 | 52.7 |
| Chloride | 0.73 | 14.9 |
| Carbonate | 0.24 | <0.1 |
| Water | 0.12 | 0.73 |
| Total | 97.94 | 104.4 |

TABLE II

|  | Coastal Mill ESP Catch Sample 1 Composition, Wt % | Coastal Mill ESP Catch Sample 2 Composition, Wt % | Coastal Mill ESP Catch Sample 3 Composition, Wt % |
|---|---|---|---|
| Sodium | 30.2 | 28.8 | 29.7 |
| Potassium | 5.7 | 4.8 | 3.2 |
| Calcium | 0.004 | 0.003 | 0.005 |
| Iron | 0.060 | 0.114 | 0.055 |
| Manganese | 0.002 | 0.003 | 0.002 |
| Magnesium | 0.002 | 0.003 | 0.003 |
| Chromium | 0.020 | 0.012 | 0.002 |
| Nickel | 0.003 | 0.006 | <0.001 |
| Copper | ND* | ND | ND |
| Aluminum | <0.010 | ND | ND |
| Lead | ND | ND | ND |
| Sulphate | 52.7 | 39.9 | 46.6 |
| Chloride | 14.9 | 17.9 | 14.3 |
| Carbonate | <0.1 | 0.2 | ND |
| Water | 0.73 | 0.68 | 0.20 |
| Organics | NA** | NA | 0.9 |
| Total | 104.4 | 92.46 | 94.97 |

*ND — Not Detected
**NA — Not Analyzed (iii) Three-Compartment Water-Splitting Cell In accordance with the invention it was found that sodium/potassium hydroxide and hydrochloric acid can be generated from a solution of ESP catch (a mixture of mostly sodium/potassium sulphate/chloride) using a three-compartment water splitter employing sequential cation-selective, monovalent anion-selective and bipolar membranes, which define adjacent acid, salt and base compartments. Depending on the current used and the desired concentration of the products high current efficiencies can be achieved.

The present invention contemplates a process which includes the following steps:

(a) dissolving an ESP catch containing alkali metal cations and monovalent and polyvalent anions in water and pre-treating this solution to remove most multivalent metal ion and organic contaminants (see section (i) above).

(b) feeding the purified solution of ESP catch into a three-compartment water splitter composed of a cation-selective, a monovalent anion-selective and a bipolar membrane, in spaced apart relationships; the solution is introduced into a salt compartment between the cation-selective membrane and the monovalent anion-selective membrane;

(c) feeding a liquid comprising water or dilute base into a base compartment, between the cation-selective membrane and the anion-selective side of the bipolar membrane;

(d) feeding a liquid comprising water or dilute acid into an acid compartment, between the monovalent anion-selective membrane and the cation-selective side of the bipolar membrane;

(e) passing a direct current through the water splitter thereby causing the transfer of alkali metal cations from the ESP catch solution to the base compartment and the formation of base (e.g., alkali metal hydroxide) in the liquid comprising water, and in addition, causing the transfer of monovalent anions (e.g. chloride) to the acid compartment and the formation of acid (e.g. hydrochloric acid);

(f) bleeding from the salt compartment a liquid comprising aqueous alkali metal salts of polyvalent anions (e.g. sodium/potassium sulphate) depleted in the salt of monovalent anions (e.g., sodium/potassium chloride).

(g) bleeding from the base compartment a liquid comprising aqueous alkali metal hydroxide;

(h) bleeding from the acid compartment a liquid comprising aqueous acid (e.g. hydrochloric acid).

The solution bled from the salt compartment in (f) may be fed to another water splitter for the production of sodium/potassium hydroxide and sulphuric acid or returned to the recovery cycle as sodium/sulphur make-up.

The solution bled from the base compartment in (g) can be used directly in the bleaching of chemical or mechanical pulps.

The solution bled from the acid compartment in (h) can be used for the regeneration of cation-exchange columns at the mill site, as the reducing agent in chlorine dioxide generators or neutralized with lime and sewered. The three-compartment water splitter referred to in the process of the invention may be any of the systems described in U.S. Pat. No. 4,592,817 to Chlanda et al. The three-compartment water splitter is typically composed of a large number of cation-selective, monovalent anion selective and bipolar membranes stacked, in sequence, between two electrodes, thereby forming a plurality of three-compartment units.

Bipolar membranes are composite membranes consisting of three parts, a cation-selective region, an anion-selective region and an interface between the two regions. When a direct current is passed across a bipolar membrane with the cation-selective side toward the cathode, electrical conduction is achieved by the transport of $H^+$ and $OH^-$ ions which are obtained from the dissociation of water. The water splitter employs suitable bipolar membranes, that can be of the type described, for example, in U-S. Pat. No. 2,829,095 to Oda et al., in U.S. Pat. No. 4,024,043 (single film bipolar membranes), in U.S. Pat. No. 4,116,889 (cast bipolar membranes) or any other type which effectively converts water into hydrogen and hydroxide ions.

The cation-selective membranes useful in the process of the present invention can be weakly acidic or strongly acidic cation-selective membranes. Examples of suitable cation-selective membranes are Nafion (Trademark)R 110, 901 and 324 of E.I. Du pont de Nemours & Co.; but other commercially available cation-selective membranes can be used. To minimize the fouling of cation-selective membranes by multivalent cations, monovalent cation-selective membranes e.g. Neosepta CMS (Trademark) can be used; these are prepared by synthesizing a thin positively-charged layer on their surface (Sata et al., J. Membr. Sci., 45, 197–208, 1989; Sata and Izuo, J. Membr. Sci., 45, 209–224, 1989; Yawataya, T., Dechema Monogr., 47, 501–514, 1962).

The anion-selective membranes useful in the process of the present invention should be monovalent anion-selective membranes such as the Selemion ASV (Trademark of Asahi Glass) membrane and the Neosepta ACS (Trademark of Tokuyama Soda Co.) membrane. In such membranes a thin layer with a high cross-linking density is synthesized upon a non-permselective membrane support (Hani et al., U.S. Pat. No. 3,276,991, Oct. 4, 1966; Gunjima, T. and Sugano, Y., Jpn. Pat. 48-34999, 1973). The thickness of this layer is optimized so as to reduce divalent-ion transport without unacceptably increasing the electric resistance of the membranes. In the case of the Selemion ASV membrane, for example, the transport number of $Cl^-$ calculated from the potential measured across the membrane between 0.5M and 1.0M NaCl solutions at 25° C. is >0.95 as given by the manufacturer, whereas the transport number of $SO_4^{2-}$ measured by the electrodialysis of sea water at a current density of $2A/dm^2$ is <0.008).

In general, stacks that are suitable for electrodialysis can be used for the water splitter. Such stacks are available commercially from Asahi Glass Co., 1–2, Marunochi 2-chome, Chiyoda-Ku and Tokuyama Soda Co., Tokyo, Japan; Ionics Inc., Watertown, Mass. and other commercial sources.

The operating temperature of the three-compartment water splitter may be any temperature compatible with the membranes and above the freezing point of the solutions, preferably in the 20°–60° C. temperature range.

The feed into the salt compartments could be any soluble salt mixture composed of monovalent cations, for example, the Group Ia alkali metals (e.g. sodium and potassium) or the non-metal monovalent cations such as ammonium ions and monovalent anions (e.g. anions of the Group VIIa elements) and polyvalent anions (e.g. sulphate, oxalate, etc.).

The operation of the water splitter is further described below:

The pre-treated ESP catch salt solution fed into the salt compartments of the water-splitting stack is of a typically 0.1 to 5.0 molar ratio of sodium/potassium chloride: sodium/potassium sulphate but may also be composed of different ratios. Typically, the concentration of the ESP catch solution to be fed into the water-splitting system would be 1.0–2.5N in sodium/potassium sulphate (solubility limit at different temperature) and 0.1–6N in sodium/potassium chloride, depending on the original composition of the solid ESP catch and the way it was dissolved in water (see section (ii)) These concentrations, however, can be higher or lower without adversely affecting the normal operation of the system. Preferably, the feed solution should be free of high levels of divalent and/or trivalent cations of elements such as calcium, magnesium, manganese, chromium, nickel and iron that will either migrate across the cation-selective membrane and precipitate in the by-product alkali metal hydroxide solution or will precipitate within and foul the cation-selective membrane. The feed solution should also be free of organic contaminants such as lignin-derived compounds that will migrate across the anion-selective membrane and precipitate in the acid solution or will precipitate within and foul the anion-selective membrane.

The liquid fed to the base compartments may be water alone, or may be water with any of a variety of electrolytes in it. Preferably, this liquid is neutral or basic (pH 7–14).

The liquid fed to the acid compartments may be water alone, or may be water with any of a variety of electrolytes in it. Preferably, this liquid is neutral or acidic (pH 0–7).

The current passed through the water splitter in conventional fashion is direct current of a voltage dictated by the resistance of the membranes and the various solution streams between the two electrodes. Current densities between about 25 and 250 mA per square centimeter are preferred. Higher or lower current densities are contemplated, however, for certain specific applications.

The result of the current flow is electrodialysis to produce a salt solution depleted in the salt of the monovalent anion (sodium/potassium chloride) in the salt compartments, a liquid comprising sodium/potassium hydroxide in the base compartments and a liquid comprising hydrochloric acid in the acid compartments. It is contemplated that by adjusting the water feed rates into the base and acid compartments and/or the current density, the concentration of the product sodium/potassium hydroxide solution and the product hydrochloric acid solution can be of any desired concentration to the extent limited by the reduction in current efficiencies that comes about as a result of back-diffusion of acid into the salt compartment.

The residence time of the aqueous ESP catch solution in the salt compartments is suitably sufficient to cause the ratio of sodium chloride to sodium sulphate in this compartment to be reduced to whatever ratio is required by the mill to avoid corrosion and other problems. Suitably the liquid comprising aqueous alkali metal hydroxide withdrawn from the output of the base compartment has a concentration between about 2 and 10 weight percent alkali metal hydroxide and the aqueous acid withdrawn from the output of the acid compartments has a concentration between about 2 and 10% hydrochloric acid.

Thus the invention contemplates (a) providing a cell comprising an anode, a cathode and at least three compartments therebetween defined at least in part by a monovalent anion-selective membrane, a cation-selective membrane and two bipolar membranes, said bipolar membranes having a cation-selective side facing said cathode and anion-selective side facing said anode, (b) feeding an aqueous solution of a mixture of salts of monovalent (MA) and polyvalent anions ($M_xB$) into a first of said compartments to contact a first side of said cation-selective membrane and a first side of said anion-selective membrane wherein M is an alkali metal cation, A is a monovalent anion, B is a multivalent anion and x is the valency of the multivalent anion, ( c) feeding liquid comprising water into a second of said compartments to contact a cation-selective side of a said first bipolar membrane and a second side of said monovalent anion-selective membrane, (d) feeding liquid comprising water into a third of said compartments to contact an anion-selective side of a said second bipolar membrane and a second side of said cation-selective membrane, (e) passing a direct current through said cell between the anode and cathode to effect:
(i) migration of said monovalent anions A from said first compartment through said monovalent anion-selective membrane into said second compartment,
(ii) migration of said alkali metal cations M from said first compartment through said cation-selective membrane into said third compartment,
(iii) splitting of water by said bipolar membranes of said second and third compartments with accumulation of hydrogen ions of the water along with the monovalent anions, B, in said second compartments and accumulation of hydroxide ions of the water along with the alkali metal cations in said third compartment, (f) removing a solution depleted in MA but not $M_xB$ from said first compartment, (g) removing accumulated HB from said second compartment, and (h) removing accumulated MOH from said third compartment.

The cation-selective membrane is, in particular, a monovalent cation-selective membrane which serves to prevent multivalent cations from entering and possibly fouling the cation-selective membrane.

In particular, the cell may have a plurality of units, each unit having three compartments comprising an acid compartment defined between the monovalent anion-selective membrane and the cation-selective side of the first bipolar membrane; a base compartment defined between the cation-selective membrane and the anion-selective side of the second bipolar membrane; and a salt compartment defined between the cation-selective and the monovalent anion-selective membrane; the solution in step (b) being fed to the salt compartment, the liquid in step (c) being fed to the acid compartment, and the liquid in step (d) being fed to the base compartment, the first compartment being the salt compartment, the second compartment being the acid compartment and the third compartment being the base compartment.

In the case where the aqueous solution in (b) is a solution of the catch of the Electrostatic Precipitator (ESP) of a kraft pulp mill chemical recovery boiler, the current efficiencies for chloride ion transport to the second compartment typically range from 50 to 80% under slightly alkaline conditions and from 5 to 50% under slightly acidic conditions in the feed compartment; and the current efficiencies for alkali metal transport to the third compartment typically range from 90 to 95% under slightly alkaline conditions and from 82–90% under slightly acidic conditions in the feed compartment.

The liquid withdrawn from the first compartment is an aqueous alkali metal sulphate salt, with reduced levels of chloride and potassium, and has a concentration in alkali metal sulphate that is almost as high as that of the feed solution, and in a particular embodiment an acidic aqueous alkali metal sulphate salt, with reduced levels of chloride, potassium and sulphate, as a result of a portion of the latter having migrated to the second compartment in the monovalent bisulphate form.

The solution recovered in step (f) typically being an alkali metal sulphate salt solution may be added as sodium/sulphur make-up to the recovery cycle of kraft pulp mills.

The liquid withdrawn from the third compartment is typically an alkali metal hydroxide solution having a concentration between about 2 and about 10 weight percent, the alkali metal hydroxide used in a bleaching stage for chemical or mechanical pulps.

The liquid withdrawn from the second compartment is typically an aqueous hydrochloric acid solution having a concentration between about 2 and about 10 weight percent; the hydrochloric acid solution may be used to regenerate a cation-exchange column thereby producing a sodium chloride solution which may be fed into a sodium chlorate plant for the production of a sodium chlorate solution; this sodium chlorate solution may be fed back into the cation-exchange column, in a separate step for the production of chloric acid; this chloric acid solution may be fed into a chlorine dioxide generator for the production of chlorine dioxide, which chlorine dioxide may be used in one or more chemical pulp bleaching stages for the production of bleached chemical pulps and chlorinated bleaching effluents; the chlorinated bleaching effluents are suitably fed back to the recovery system of the mill for their conversion to carbon dioxide, water and sodium chloride, which sodium chloride may be directed to the ESP of the chemical recovery boiler where it is captured along with sodium sulphate in the solid form, this sodium chloride/sodium sulphate solid mixture may be dissolved in water, pre-treated and fed to a three-compartment water splitting stack for the production of a sodium sulphate solution, partially or fully depleted in chloride and potassium; sodium hydroxide; and hydrochloric acid which is used as indicated above.

The process permits the partial or complete purging of the non-process elements chloride, potassium and excess sulphur from the recovery cycle of kraft pulp mills using ECF (elemental chlorine free) or TCF (totally chlorine free) bleaching sequences; and a partially or totally effluent free (TEF) kraft pulp mill may be achieved in terms of the elements sodium, sulphur and chlorine.

(iv) Two-compartment water-splitting cell

In accordance with the invention it has been found that a mixture of sodium/potassium sulphate and hydroxide as well as hydrochloric acid can be generated from a solution of ESP catch by using a two-compartment water splitter employing alternate bipolar and monovalent anion-selective membranes, which define adjacent acid and salt/base compartments. Depending on the current used and the desired concentration of the products, high current efficiencies can be achieved.

The present invention contemplates a process which includes the following steps:

(a) Dissolving the ESP catch in water and pretreating this solution to remove most multivalent metal ions and organic contaminants (see section (ii) above).

(b) feeding the purified solution of ESP catch into a two-compartment water splitter composed of alternating bipolar and monovalent anion-selective membranes; the solution is introduced into each salt/base compartment between the anion-selective side of a bipolar membrane and the adjacent monovalent anion-selective membrane;

(c) feeding a liquid comprising water or dilute acid into each acid compartment, between a monovalent anion-selective membrane and the cation-selective side of an adjacent bipolar membrane;

(d) passing a direct current through the water splitter thereby causing the transfer of monovalent anions (e.g. chloride) from the ESP catch solution to the acid compartment thereby causing acidification of the liquid comprising water, (e) bleeding from the salt/base compartments liquid comprising alkali metal salts of polyvalent anions (e.g. a sodium/potassium sulphate solution) that is depleted in monovalent anions (e.g. chloride) and enriched in alkali metal hydroxide; this solution could be adjusted to have the composition of oxidized white liquor.

(f) bleeding from the acid compartments a liquid comprising an aqueous acid of a monovalent anion (e.g. hydrochloric acid).

The solution bled from the salt/base compartment in (e) may be used as sodium/sulphur make up to the recovery cycle or, after the composition is adjusted to reflect that of oxidized white liquor, it may be used in oxygen delignification or in a bleaching extraction stage. This solution may be particularly suited for the latter two applications since, in contrast to mill oxidized white liquor, it is free of heavy metals and calcium.

The solution bled from the acid compartment in (f) can be used for the regeneration of cation-exchange columns at the mill site, as the reducing agent in chlorine dioxide generators, for the neutralization of alkaline effluents, or it can be neutralized with lime and sewered. The two-compartment water splitter referred to in the process of the invention may be any of the systems described in U.S. Pat. No. 4,082,835 to Chlanda et al. (1979). The two-compartment water splitter is composed of a large number of bipolar and monovalent anion selective membranes in alternate relationship stacked between two electrodes, thereby defining a plurality of two-compartment units.

The bipolar and monovalent anion-selective membranes as well as the stacks used in the two-compartment water splitter may be those described above for the three-compartment splitter.

The operation of the water splitter is further described below:

The two-compartment water-splitter is operated under similar under similar conditions as the three-compartment water-splitter in terms of temperature, pressure between compartments, composition, concentration and pre-treatment of feed solution, current density and other experimental parameters.

In contrast to the three-compartment configuration, it is expected that, given the high pH of the salt/acid compartment, in the case of the two-compartment configuration, di- and/or multivalent metal ions present in the feed solution, such as calcium, magnesium, manganese, chromium, nickel and iron, will not pose significant problems since these are likely to be suspended in solution in their hydroxide colloidal form. The feed solution should be free of organic contaminants such as phenolic-type lignin fragments since at the high pH of the salt/base compartment these are likely to be highly solubilized and are expected to migrate across the anion-selective membrane and precipitate within and foul this membrane. As in the case of the three-compartment configuration, membrane fouling problems can be minimized by suitably pre-treating the ESP catch before introduction into the water-splitting system.

The liquid fed to the acid compartments may be water alone, or may be water with any of a variety of electrolytes in it. Preferably, this liquid is neutral or acidic (pH 0–7).

The current passed through the water splitter in conventional fashion is direct current of a voltage dictated by the resistance of the membranes and the various solution streams between the two electrodes. Current densities between about 25 and 250 mA per square centimeter are preferred. Higher or lower current densities are contemplated, however, for certain specific applications.

The result of the current flow is electrodialysis to produce an alkaline salt solution depleted in the monovalent anion (chloride) in the salt/base compartments, and a liquid comprising hydrochloric acid in the acid compartments. It is contemplated that by adjusting the water feed rates into the acid compartments and/or the current density, the product hydrochloric acid solution can be of any desired concentration to the extent limited by the reduction in current efficiencies that comes about as a result of back-diffusion of acid into the salt/base compartment. The residence time of the aqueous ESP catch solution in the salt/base compartments is suitably sufficient to cause the ratio of sodium chloride to sodium sulphate in this compartment to be reduced to whatever ratio is required by the mill to avoid corrosion and other problems. Suitably the liquid comprising hydrochloric acid withdrawn from the output of the acid compartment has a concentration between about 2 and 10 weight percent hydrochloric acid. Thus the invention contemplates a process comprising:

(a) providing a cell comprising an anode, a cathode and at least two compartments there-between defined at least in part by a monovalent anion-selective membrane and two bipolar polar membranes, said bipolar membranes having a cation-selective side facing said cathode and anion-selective side facing said anode, (b) feeding an aqueous solution of a mixture of salts of monovalent (MA) and polyvalent anions ($M_xB$) into a first of said compartments to contact a first side of said anion-selective membrane and an anion-selective side of a first of said bipolar membranes, wherein M is an alkali metal cation, A is a monovalent anion, B is a multivalent anion and x is the valency of the multivalent anion, (c) feeding liquid comprising water into a second of said compartments to contact a second side of said monovalent anion-selective membrane and a cation-selective side of a second of said bipolar membranes, (d) passing a direct current through said water splitter thereby causing the transfer of monovalent anions, except hydroxide, from said salt solution of the first compartment to the second compartment and their replacement by hydroxide ions from the first bipolar membrane, (e) removing a solution depleted in MA but not $M_xB$ and enriched in MOH from said first compartment, and (f) removing accumulated HA from said second compartment.

The cell may have a plurality of units, each unit having two compartments comprising a salt/base compartment defined between a first side of the monovalent anion-selective membrane and the anion-selective side of a first bipolar membrane, and an acid compartment defined between a second side of the monovalent anion-selective membrane and the cation-selective side of a second bipolar membrane; the solution in step (b) being fed to the salt/base compartment and the liquid in step (c) being fed to the acid compartment, the first compartment being the salt/base compartment and the second compartment being the acid compartment.

The aqueous solution in (b) may, in particular, be a solution of the catch of the Electrostatic Precipitator (ESP) of a kraft pulp mill chemical recovery boiler.

The process current efficiencies for chloride and sulphate transport to the second compartment typically range from 60 to 100% and from 2 to 3%, respectively, under the alkaline conditions of the first compartment and as long as the back-diffusion of acid from the second compartment into the first compartment is minimized by maintaining a low concentration of acid in the second compartment (<0.7N).

Surprisingly, the hydroxide generated in the first compartment migrates to the second compartment at a much slower rate than chloride, thereby leading to the build-up of appreciable concentrations of this anion in the first compartment in the form of alkali metal hydroxide.

The liquid withdrawn from the first compartment is, in particular, an aqueous alkali metal sulphate salt, with reduced levels of chloride, enriched in alkali metal hydroxide. The concentrations of the alkali metal sulphate and alkali metal hydroxide can be as high as the concentration of alkali metal sulphate and alkali metal chloride, respectively, in the feed solution. The alkali metal sulphate/hydroxide solution may be added as sodium/sulphur make-up to the recovery cycle; or the alkali metal sulphate/hydroxide solution may be adjusted to have the composition of oxidized white liquor and subsequently be used in oxygen delignification and/or a bleaching extraction stage.

The liquid withdrawn from the second compartment is typically an aqueous hydrochloric acid solution having a concentration between about 2 and about 10 weight percent, and may be used as described in (iv) above. By operating as described in (iv) above, the process permits the partial or complete purging of the non-process element chloride from the recovery cycle of kraft pulp mills using ECF or TCF bleaching sequences; and a partially or totally effluent free (TEF) kraft pulp mill can be achieved in terms of the elements sodium, sulphur and chlorine.

(v) Two-Compartment Electrodialysis (ED) Cell

In accordance with the invention it has also been found that sodium/potassium chloride can be removed from a solution of ESP catch by using a two-compartment ED system employing alternate cation-selective and monovalent anion-selective membranes. Depending on the current used and the desired concentration of the products, high current efficiencies can be achieved.

The present invention contemplates a process which includes the following steps:

(a) Dissolving the ESP catch in water and pretreating this solution to remove polyvalent metal ion and organic contaminants (see section (ii) above);

(b) feeding the purified solution of ESP catch into an ED system composed of alternate cation-selective and monovalent anion-selective membranes; the solution is introduced into each diluting compartment between a cation-selective membrane and a monovalent anion-selective membrane;

(c) feeding a liquid comprising water or dilute sodium chloride into each concentrating compartment, between a cation-selective membrane and a monovalent anion-selective membrane;

(d) passing a direct current through the ED system thereby causing the transfer of alkali metal ions and monovalent anions (e.g. chloride ions) from the ESP catch solution in the diluting compartments to the concentrating compartments;

(e) bleeding from the concentrating compartments a liquid comprising aqueous alkali metal salts of monovalent anions (e.g. sodium/potassium chloride);

(f) bleeding from the diluting compartments a liquid depleted in the monovalent anions (e-g. chloride ions) comprising alkali metal salts of polyvalent anions (e.g. aqueous sodium/potassium sulphate).

The solution bled from the concentrating compartments (e.g., sodium/potassium chloride in (e) may be fed to a water splitter for the production of alkali metal hydroxide (e.g. sodium/potassium hydroxide) and acid (e.g. hydrochloric acid), it could be used as a reducing agent in chlorine dioxide generators, it could be used as a feedstock to a chloralkali plant for the production of chlorine and caustic soda or a sodium chlorate plant for the production of sodium chlorate. In the absence of any use of this solution at the mill site, it can be sewered.

The solution bled from the diluting compartments in (f) can be used as sodium/sulphur make-up in the kraft recovery cycle or fed to a water-splitter for the production of alkali metal hydroxide (e.g., sodium/potassium hydroxide) and acid (e.g., sulphuric acid).

The two-compartment ED system referred to in the process of the invention may be any of the systems described in U.S. Pat. No. 4,715,939 to Ball et al. The two-compartment ED system is composed of a large number of cation-selective and monovalent anion-selective membranes alternately stacked between two electrodes.

The monovalent anion-selective and cation-selective membranes as well as stacks used in the two-compartment ED system may be those described above for the three-compartment water splitter.

The ED system can be operated under similar conditions as the three-compartment water-splitter in terms of temperature, pressure between compartments, feed solution composition, concentration, pretreatment and other experimental parameters.

The operation of the ED system is further described below:

The liquid fed to the concentrating compartments may be water alone, or may be water with any of a variety of electrolytes in it. Preferably, this liquid is neutral with a low concentration of sodium chloride in it.

The current passed through the ED system in conventional fashion is direct current of a voltage dictated by the resistance of the membranes and the various solution streams between the two electrodes. Current densities between about 10 and 150 mA per square centimeter are preferred. Higher or lower current densities are contemplated, however, for certain specific applications, as dictated by the limiting polarization current of the system in question.

The result of the current flow is electrodialysis to produce a sodium sulphate salt solution depleted in the salt of the monovalent anion (sodium/potassium chloride) in the diluting compartments and a liquid comprising sodium/potassium chloride in the concentrating compartments. It is contemplated that by adjusting the water feed rates into the concentrating compartments and/or the current density, the concentration of the product sodium/potassium chloride solution can be of any desired concentration.

The residence time of the aqueous ESP catch solution in the diluting compartments is suitably sufficient to cause the ratio of sodium/potassium chloride to sodium/potassium sulphate in this compartment to be reduced to whatever ratio is required by the mill to avoid corrosion and other problems. Suitably the liquid comprising aqueous alkali metal chloride withdrawn from the output of the concentrating compartment has a concentration between about 2 and 30 weight percent alkali metal chloride Thus the invention contemplates a process comprising:

(a) providing a cell comprising an anode, a cathode and at least in part by a monovalent anion-selective membrane and first and second cation-selective membranes;

(b) feeding an aqueous solution of a mixture of salts of monovalent (MA) and polyvalent anions ($M_xB$), wherein M is an alkali metal cation, A is a monovalent anion, B is a multivalent anion and x is the valency of the polyvalent anion, into a first of said compartments to contact first side of said monovalent anion-selective membrane and first side of said first cation-selective membrane;

(c) feeding liquid comprising water into a second of said compartments to contact a second side of said monovalent anion-selective membrane and a second side of said second cation-selective membrane, (d) passing a direct current through said cell between the anode and cathode to effect:

(i) migration of said monovalent anions A from said first compartment through said monovalent anion-selective membrane into said second compartment, and (ii) migration of said alkali metal cations M from said first compartment through said first cation-selective membrane into said second compartment, (e) removing a solution depleted in MA but not $M_xB$ from said first compartment, and (f) removing accumulated MA from said second compartment.

The cation-selective membrane is, in particular, a monovalent cation-selective membrane which serves to prevent multivalent cations from entering and possibly fouling the cation-selective membrane.

The cell may have a plurality of units, each unit having two compartments comprising a first compartment defined between a first side of the monovalent anion-selective membrane and a first side of a first cation-selective membrane, and a second compartment defined between a second side of the monovalent anion-selective membrane and the second side of a second cation-selective membrane; the solution in step (b) being fed to said first compartment and the liquid in step (c) being fed to the second compartment, the first compartment being the diluting compartment and the second compartment being the concentrating compartment.

The aqueous solution in (b) may, in particular, be a solution of the catch of the Electrostatic Precipitator (ESP) of a kraft pulp mill chemical recovery boiler.

The current efficiencies for chloride and sulphate transport to the second compartment typically range from 60 to 80% and from 3 to 8%, respectively, under the nearly neutral conditions of the first compartment and as long as the chloride concentration in the first compartment is not less than 0.33N. The current efficiency for sodium transport to the second compartment typically ranges from 75 to 100% under the nearly neutral conditions of the first compartment and as long as the chloride concentration in the first compartment is not less than 0.10N.

The liquid withdrawn from the second compartment may, in particular, be an aqueous sodium chloride solution having a concentration between about 2 and about 30 weight percent; the sodium chloride solution may be fed into a sodium chlorate plant for the production of a sodium chlorate solution, the resulting sodium chlorate solution is fed to an electrolysis cell for the production of sodium hydrixide, which is used in bleaching and chloric acid; the chloric acid solution is fed into a chlorine dioxide generator for the production of chlorine dioxide; the chlorine dioxide is used in one or more chemical pulp bleaching stages for the production of bleached chemical pulps and chlorinated bleaching effluents; the chlorinated bleaching effluents are fed back to the recovery system of the mill for their conversion to carbon dioxide, water and sodium chloride; the sodium chloride is directed to the ESP of the chemical recovery boiler where it is captured along with sodium sulphate in the solid form; the sodium chloride/sodium sulphate solid mixture is dissolved in water, pre-treated and fed to an electrodialysis stack for the production of a sodium sulphate solution, partially or fully depleted in chloride and potassium; and sodium chloride which is directed to the first step above.

The partial or complete purging of the non-process elements chloride and potassium from the recovery cycle of kraft pulp mills using ECF (elemental chlorine free) or TCF (totally chlorine free) bleaching sequences is thus accomplished.

A partially or totally effluent free (TEF) kraft pulp mill may thus be achieved, in terms of the elements sodium, sulphur and chlorine.

BRIEF DESCRIPTION OF THE DRAWINGS

The invention is illustrated in preferred embodiments by reference to the accompanying drawings in which:

FIG. 6 illustrates schematically the integration of an ED system into a closed-cycle ECF kraft mill.

DESCRIPTION OF PREFERRED EMBODIMENTS WITH REFERENCE TO THE DRAWINGS

Figure 1:
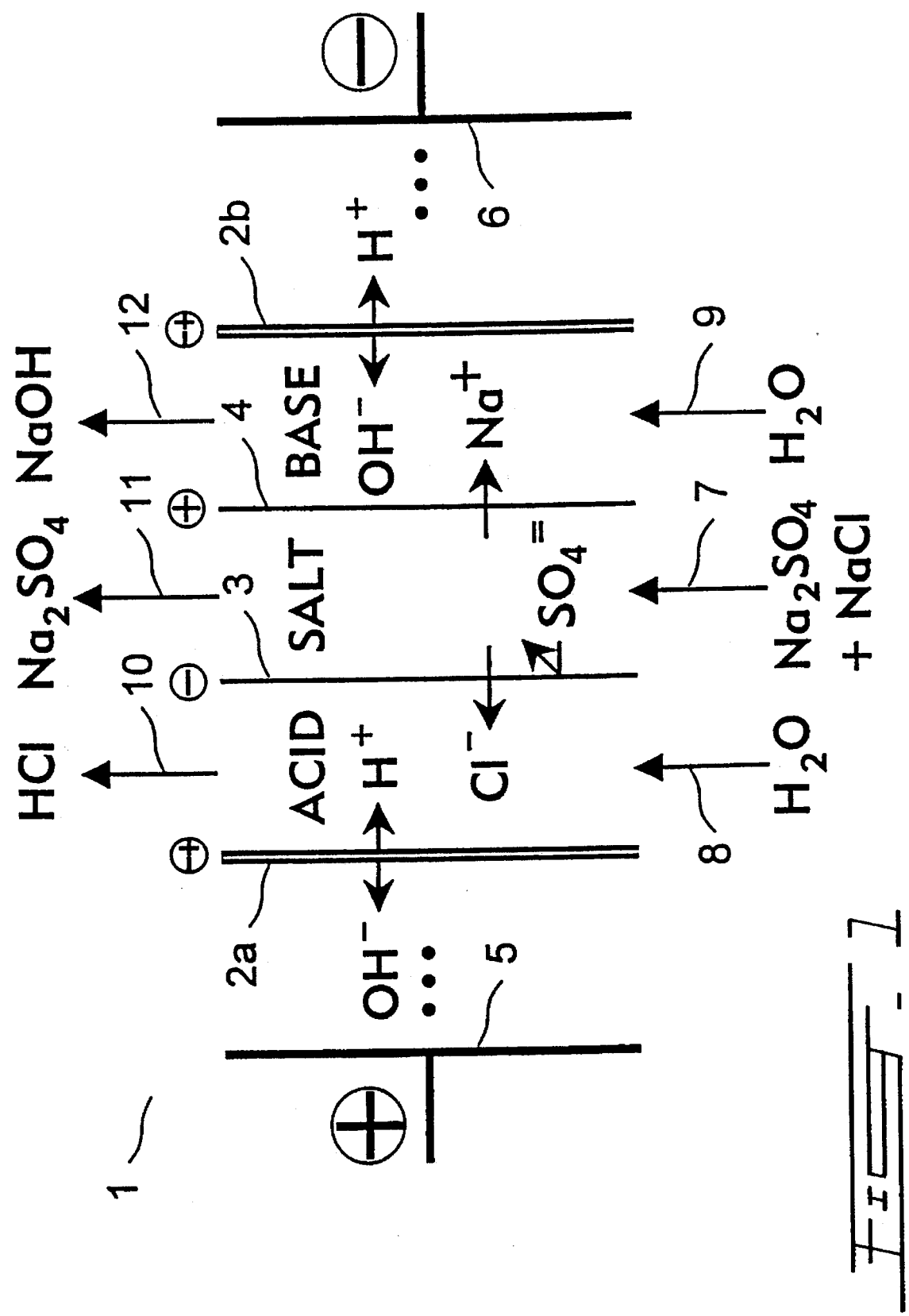
FIG. 1 illustrates schematically a three-compartment water-splitting system.

FIG. 1 illustrates the process of the invention employing a three-compartment water-splitting cell. A water-splitter, 1, is shown with bipolar membranes, 2, monovalent anion-selective membranes 3, and cation-selective membranes 4, alternately stacked together between an anode 5 and a cathode 6. In FIG. 1 two bipolar membranes 2a, and 2b, one anion-selective membrane 3, and one cation-selective membrane 4, are shown, however, a much greater number of such units can be incorporated between the two electrodes as suggested by the three dots near each electrode in FIG. 1. A minimum of two bipolar, one monovalent anion-selective and one cation-selective membranes are needed for a complete three-compartment unit. The bipolar membranes 2 must be oriented with the cation-selective side facing towards the cathode 6.

A solution of ESP catch is fed in stream 7 into the water-splitting stack 1 between the cation-selective membrane 4 and anion-selective membrane 3 (salt compartment).

Simultaneously, water, which may contain an electrolyte, and especially hydrochloric acid, is fed in stream 8 into the water-splitting stack 1 between anion-selective membrane 3 and the cation-selective side of bipolar membrane 2a (acid compartment). In addition, a water stream 9, which may contain an electrolyte, and especially low concentrations of base, is fed into the water-splitting stack 1 between cation-selective membrane 4 and the anion-selective side of bipolar membrane 2b (base compartment). An alkaline solution such as sodium hydroxide or a neutral solution such as sodium sulphate is fed to the compartments adjacent the anode 5 and cathode 6 from a reservoir, and returned from these compartments to the reservoir, after degassing to remove hydrogen and oxygen.

Current is passed between anode 5 and cathode 6 through the water-splitting stack 1, causing alkali metal cations to migrate toward the cathode 6 across the cation-selective membrane 4 and monovalent anions such as chloride ions to migrate towards the anode 5 across monovalent anion-selective membrane 3. In addition, water is split in bipolar membranes 2a and 2b with the hydrogen ions migrating into the acid compartments and the hydroxide anions migrating into the base compartments. Accordingly, alkali metal hydroxide is formed in each of the base compartments between a cation-selective membrane 4 and the anion-selective side of a bipolar membrane 2b, and this alkali metal hydroxide is bled from the water-splitting stack 1 through stream 12. The acid compartments between the cation-selective side of each bipolar membrane 2a and the adjacent monovalent anion-selective membrane 3 will contain hydrochloric acid which is bled from these compartments through stream 10. The salt compartments between the cation-selective membranes 4 and the anion-selective membranes 3 will contain a solution depleted from the salt of the monovalent anion which is bled in stream 11.

Figure 2:
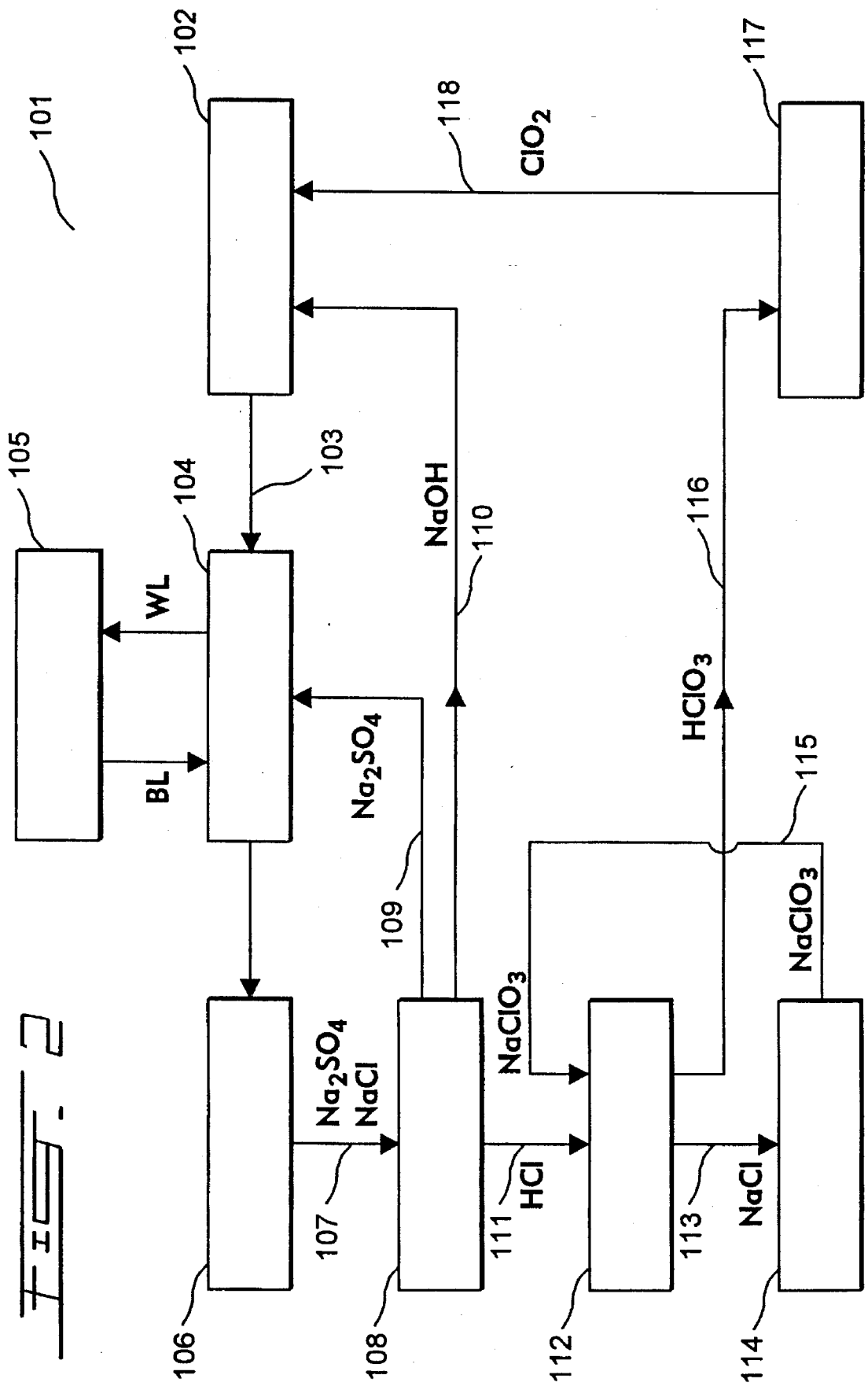
FIG. 2 illustrates schematically the integration of a three-compartment water-splitting system into a closed-cycle ECF kraft mill.

FIG. 2 illustrates how the process of FIG. 1 can be employed to achieve a partially or totally effluent free (TEF) kraft pulp mill 100, with respect to the elements sodium, sulphur and chlorine. In such a mill the chlorinated-bleaching effluents 103 from the bleach plant 102 will be returned to the recovery system 104 of the pulp mill 105. In time, the inorganic chlorides are expected to accumulate in the recovery system of the pulp mill and particularly the ESP catch 106 of the recovery boiler. To resolve this problem, the ESP catch can be dissolved in water to form stream 107 and fed into a three-compartment water-splitting system 108, incorporating bipolar, cation-selective and monovalent anion-selective membranes, to be separated into its component alkali metal sulphate, which is returned to the recovery cycle through stream 109, into an alkali metal hydroxide stream 110 which is directed to the bleach plant 102 and a hydrochloric acid stream 111 which is used in the regeneration of a cation-exchange column 112. The product of the ion-exchange column regeneration will be a chloride stream 113 which is directed to a sodium chlorate plant 114. The chlorate produced, stream 115, is subsequently fed to the ion-exchange column 112 which converts it to a chloric acid stream 116, which is fed to the chlorine dioxide generator 117 for the production of chlorine dioxide 118 which is also directed to the bleach plant 102. This approach to ECF kraft mill closure, not only removes chloride from the recovery cycle and converts it to chlorate but also it reduces or eliminates the sodium sulphate by-product of chlorine dioxide generators through the indirect splitting of sodium chlorate into sodium hydroxide and chloric acid.

Figure 3:
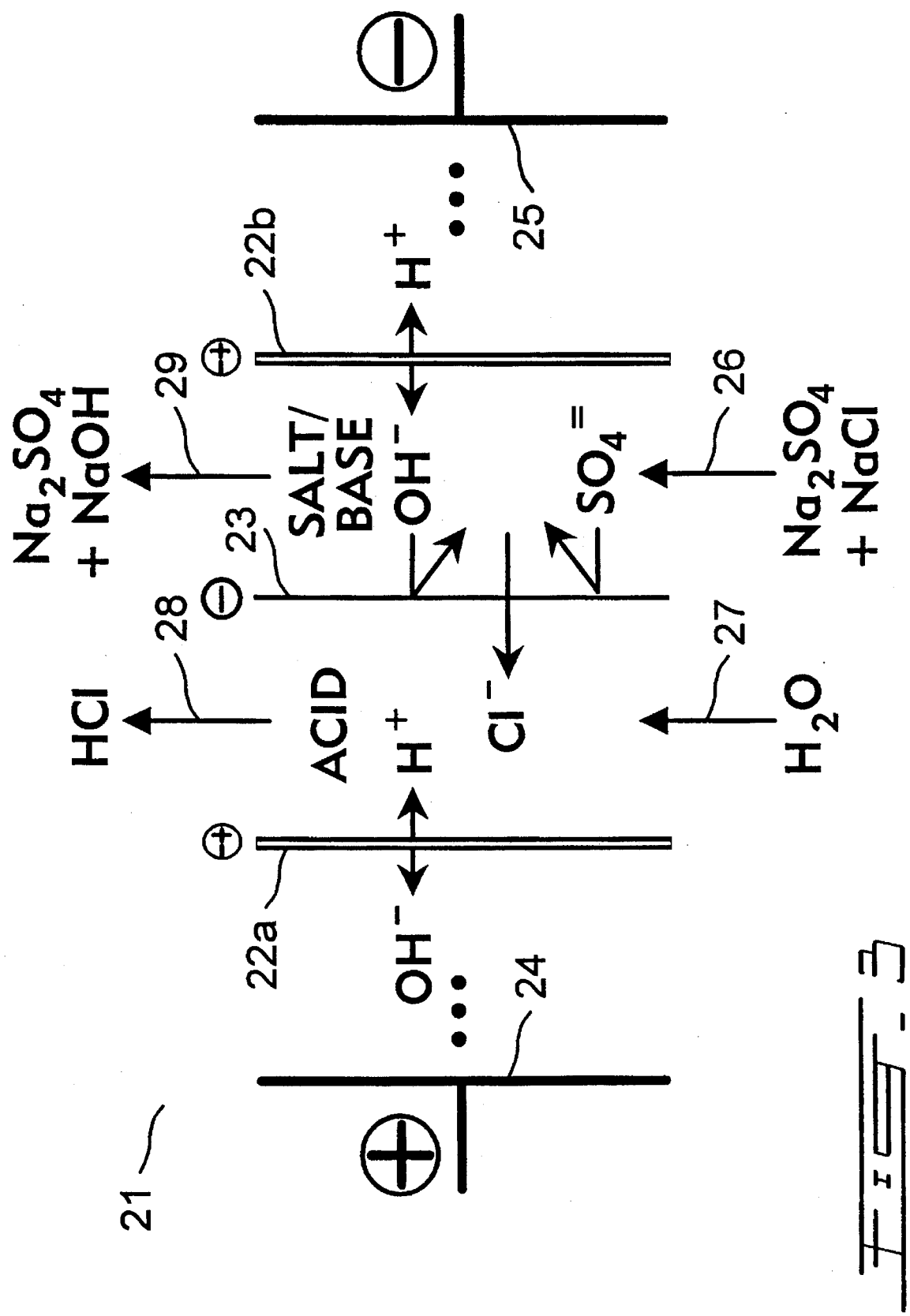
FIG. 3 illustrates schematically a two-compartment water-splitting system.

FIG. 3 illustrates the process of the invention employing a two-compartment water-splitting cell. A water-splitter 21, is shown with bipolar membranes 22, and monovalent anion-selective membranes 23, alternately stacked together between an anode 24 and a cathode 25. In FIG. 3 two bipolar membranes 22a, and 22b and one monovalent anion-selective membrane 23 are shown, however, a much greater number of such units can be incorporated between the two electrodes 24, 25 as suggested by the three dots near each electrode in FIG. 3. A minimum of two bipolar and one anion-selective membranes are needed for a complete two-compartment unit. The bipolar membranes must be oriented with the cation-selective side facing towards the cathode 25.

A solution of ESP catch is fed in stream 26 into the water-splitting stack 21 between the monovalent anion-selective membrane 23 and the anion-selective side of the bipolar membrane 22b (salt/base compartment).

Simultaneously, a water stream 27, which may contain an electrolyte, and especially hydrochloric acid, is fed into the water-splitting stack 21 between the monovalent anion-selective membrane 23 and the cation-selective side of bipolar membrane 22a (acid compartment). An alkaline solution such as sodium hydroxide or a neutral solution such as sodium sulphate is fed to the compartments adjacent to the anode 24 and cathode 25 from a reservoir, and returned from these compartments to the reservoir, after degassing to remove hydrogen and oxygen.

Current is passed between anode 24 and cathode 25 through the water-splitting stack 21, causing monovalent anions such as chloride ions to migrate toward the anode 24 across the monovalent anion-selective membrane 23. In addition, water is split in bipolar membranes 22a and 22b with the hydrogen ions migrating into the acid compartments and the hydroxide anions migrating into the salt/base compartments. A surprising discovery of this invention is that, even though hydroxide ions are monovalent in nature, they do not begin to migrate through the monovalent anion-selective membranes until most of the chloride is depleted from this compartment. Accordingly, an alkali metal hydroxide is formed in each of these compartments (salt/base), and this alkali metal hydroxide is bled from the water-splitting stack 21 through stream 29 along with alkali metal sulphate depleted in chloride. The acid compartments between the cation-selective side of each bipolar membrane 22a and the adjacent monovalent anion-selective membrane 23 will contain hydrochloric acid which is bled from these compartments through stream 28.

Figure 4:
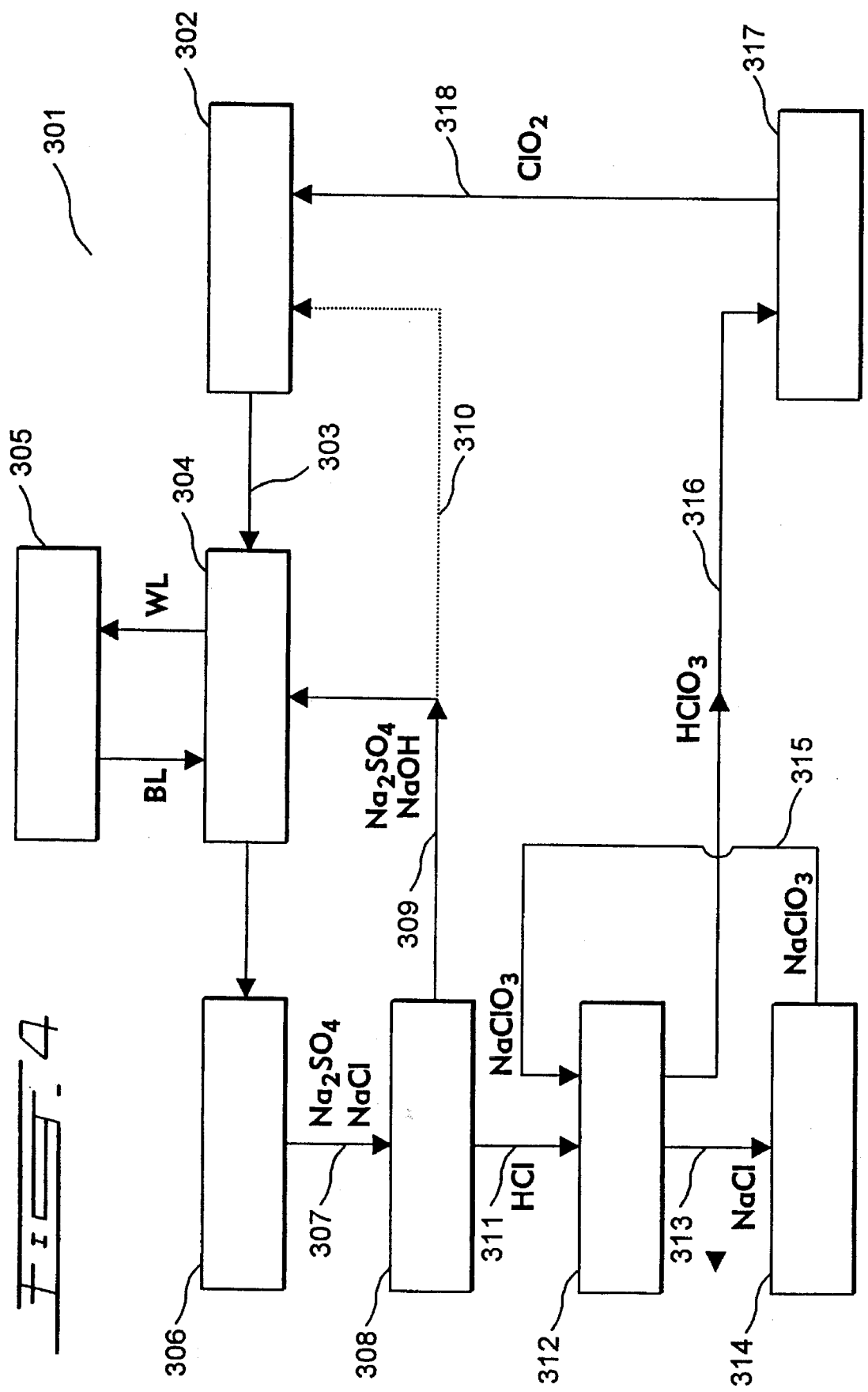
FIG. 4 illustrates schematically the integration of a two-compartment water-splitting system into a closed-cycle ECF kraft mill.

FIG. 4 illustrates how the process of FIG. 3 can be employed to achieve a partially or totally effluent free (TEF) kraft pulp mill 301 with respect to the elements sodium, sulphur and chlorine. In such a mill, the chlorinated bleaching effluents 303 from the bleach plant 302 will be returned to the recovery system 304 of the pulp mill 305. In time, the inorganic chlorides are expected to accumulate in the recovery system of the pulp mill and particularly the ESP catch 306 of the recovery boiler. To resolve this problem, the ESP catch can be dissolved in water to form stream 307 and fed into a two-compartment water-splitting system 308, incorporating bipolar and monovalent anion-selective membranes, to be separated into a stream composed of sodium sulphate and sodium hydroxide, which is returned to the recovery cycle through stream 309, or directed to the bleach plant 302 through stream 310, and a hydrochloric acid stream 311 which is used in the regeneration of a cation-exchange column 312. The product of the ion-exchange column regeneration will be a sodium chloride stream 313 which is directed to a sodium chlorate plant 314. The sodium chlorate produced, stream 315, is subsequently fed to the cation-exchange column 312 which converts it to a chloric acid stream 316, which is fed to the chlorine dioxide generator 317 for the production of chlorine dioxide 318 which is also directed to the bleach plant 302. This approach to ECF kraft mill closure, not only removes chloride from the recovery cycle and converts it to sodium chlorate but also it reduces or eliminates the sodium sulphate by-product of chlorine dioxide generators through the conversion of sodium chlorate to chloric acid prior to its introduction into the chlorine dioxide generator.

Figure 5:
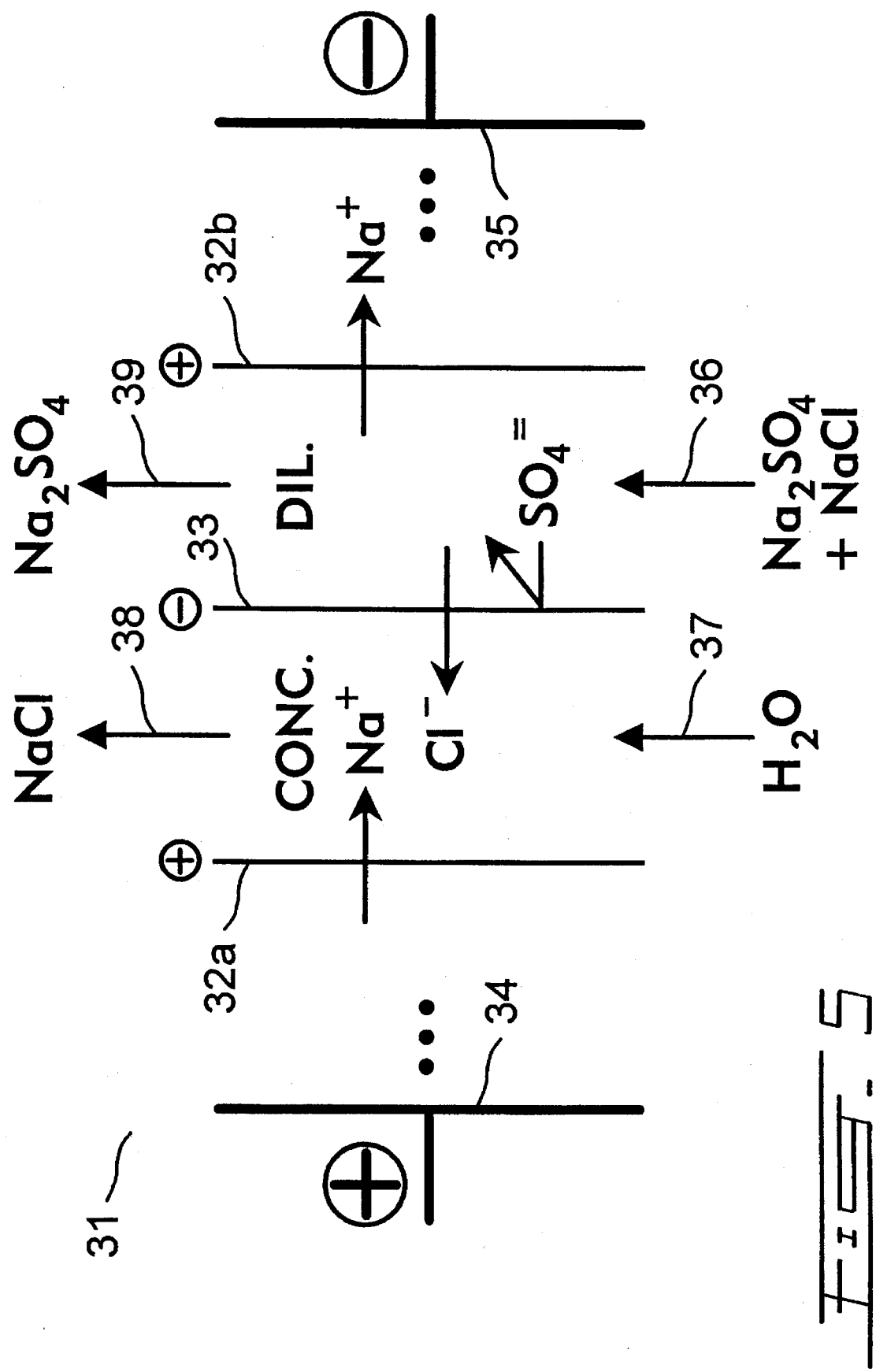
FIG. 5 illustrates schematically a two-compartment ED system.

FIG. 5 illustrates the process of the invention employing a two-compartment ED cell. An ED cell 31, is shown with cation-selective membranes 32, and monovalent anion-selective membranes 33, alternately stacked together between an anode 34 and a cathode 35. In FIG. 5, two cation-selective membranes 32a and 32b and one monovalent anion-selective membrane 33 are shown, however, a much greater number of such units can be incorporated between the two electrodes, 34, 35 as suggested by the three dots near each electrode in FIG. 5. A minimum of two cation-selective and one anion-selective membranes are needed for a complete two-compartment ED unit.

A solution of ESP catch is fed in stream 36 into the ED cell 31 between the monovalent anion-selective membrane 33 and the cation-selective membrane 32b (diluting compartment).

Simultaneously, a water stream 37, which may contain an electrolyte, and especially alkali metal chloride, is fed into the ED cell stack 31 between the monovalent anion-selective membrane 33 and the cation-selective membrane 32a (concentrating compartment). An alkaline solution such as sodium hydroxide or a neutral solution such as sodium sulphate is fed to the compartments adjacent to the anode 34 and cathode 35 from a reservoir, and returned from these compartments to the reservoir, after degassing to remove hydrogen and oxygen.

Current is passed between anode 34 and cathode 35 through the ED cell stack 31, causing monovalent anions such as chloride ions to migrate toward the anode across the monovalent anion-selective membrane 33. In addition, alkali metal ions are induced by the electric field to migrate through the cation-selective membrane 32b towards the cathode 35. Accordingly, sodium/potassium chloride accumulates in the concentrating compartments and this is bled from the ED system through stream 38. Chloride-free sodium/potassium sulphate remains in the diluting compartments and this is bled from the ED system through stream 39.

FIG. 6 illustrates how the process of FIG. 5 can be employed to achieve a partially or totally effluent free (TEF) kraft pulp mill 401 with respect to the elements sodium, sulphur and chlorine. In such a mill 401 the chlorinated bleaching effluents 403 from the bleach plant 402 will be returned to the recovery system 404 of the pulp mill 405. In time, the inorganic chlorides are expected to accumulate in the recovery system of the pulp mill and particularly the ESP catch 406 of the recovery boiler. To resolve this problem, the ESP catch can be dissolved in water to form stream 407 and fed into an ED system 408 to be separated into its component sodium sulphate, which is returned to the recovery cycle through stream 409 and into a sodium chloride stream 410 which is directed to a sodium chlorate plant 411. The sodium chlorate produced in stream 412, is subsequently fed to an electrolysis or water-splitting system 413 in which it is split into its component base, sodium hydroxide (stream 414) which is directed to the bleach plant 402, and chloric acid 415, which is fed to the chlorine dioxide generator 416 for the production of chlorine dioxide 417 which is also directed to the bleach plant 402 (Paleologou et al., J. Pulp. Pap. Sci., 20 (2), 39–45 (1994). This approach to ECF kraft mill closure, not only removes chloride from the recovery cycle and converts it to chlorate but also it reduces or eliminates the sodium sulphate by-product of chlorine dioxide generators through the splitting of sodium chlorate into sodium hydroxide and chloric acid.

EXAMPLES

Example 1

The solid ESP catch used in this experiment was supplied by a western Canadian coastal mill. The solution prepared from the as-received material contained a number of contaminants (see Table III).

TABLE III

| | Contaminant concentration in the ESP catch solution before pre-treatment, ppm | Contaminant concentration in the ESP catch solution after pre-treatment, ppm |
|---|---|---|
| Calcium | 8 | 8 |
| Iron | 83 | <0.8 |
| Manganese | 3 | <0.07 |
| Magnesium | 4 | <0.07 |
| Chromium | 3 | <0.27 |
| Nickel | <1 | <0.18 |
| Copper | ND | ND |
| Aluminum | ND | ND |
| Lead | ND | ND |
| Organics | 136 | 12 |
| Total | 238 | 22 |

To avoid any membrane fouling problems from polyvalent metal and organic contaminants, the feed solution of ESP catch was pre-treated. The contaminants were removed by:

(a) Dissolving the ESP catch in water and then filtering the resulting dark brown solution.

(b) Shaking the solution with activated carbon to produce a colourless filtrate.

(c) Making the solution alkaline to precipitate out the hydroxides of the multivalent metals.

(d) Shaking the solution again with activated carbon and filtering to remove the solids.

Following the above pre-treatment of the ESP catch, the resulting solution was 1.87N in sodium, 0.17N in potassium, 0.55N in chloride and 1.57N in sulphate. The pre-treatment lowered the multivalent metal contamination from 94 ppm down to less than 2 ppm (removal efficiency of 98%) with the exception of Ca which remained unaffected at 8 ppm (see Table III). Although this level of Ca did not foul the membranes in a 6-hour test, total calcium removal (down to 50 ppb) can be achieved by using chelating ion-exchange resins with aminophosphonic functional groups, at alkaline pH (Langeland, O., Oslo Symposium: Ion Exchange and Solvent Extraction, Soc. Chem. Ind., London, UK, pp. IV/52-IV/61, 1982) or by passing the solution through a column packed with Chelex 100 (Trademark of BIO-RAD) resin; this is a styrene divinylbenzene copolymer containing paired iminodiacetate ions which act as chelating agents in binding polyvalent metal ions. Its selectivity for divalent over monovalent ions is approximately 5,000 to 1. The organics content also decreased from 136 ppm to 12 ppm (removal efficiency of 92%). The remaining organics would likely be of low molecular weight and water soluble, and should not affect membrane life.

The cell shown in FIG. 1 was used to demonstrate how a solution of pre-treated ESP catch can be depleted of alkali metal chloride. A pilot cell stack consisting of four, 3-compartment unit cells arranged between two electrodes was used. The arrangement of the cell is illustrated in FIG. 1. For simplicity this figure shows only one cell with electrodes on either side. The cation-selective membranes were Asahi Glass Selemion CMV membranes, the bipolar membranes were WSI 4010/1030 membranes and the anion-selective membranes were Asahi Glass Selemion ASV monovalent anion-selective membranes. The cation-selective membranes used in the electrode rinse compartments were Nafion 417. Each membrane had an exposed area of 91 cm$^2$. A 10% sodium hydroxide solution was fed to the compartments adjacent to the anode and the cathode from a reservoir and returned to the reservoir, after degassing to remove hydrogen and oxygen. Each cell compartment was connected to its appropriate reservoir tank and all compartments operated in the batch mode. A batch mode refers to the case in which the same solution is being recirculated continuously through the system thereby allowing the accumulation of products in the acid and base compartments. Table IV shows the conditions used for the operation of the cell stack.

TABLE IV

| | Acid HCl | Base MOH* | Salt expressed as MCl/M$_2$SO$_4$ |
|---|---|---|---|
| Initial Concentration in Loop, N | 0.14 | 0.14 | 2.04 |
| Initial Volume in Loop, L | 7.3 | 7.5 | 7.0 |
| Circulation Rate, L/min | 1.02 | 0.64 | 0.35 |
| Hydraulic Pressure, kPa | 55 | 55 | 55 |

*M represents both sodium and potassium.

The various loops were filled with the indicated solutions to maintain high conductivity in all the solutions during the initial stages of the run. The circulation rates were chosen such that the pressures in the three compartments were roughly 55 kPa (8.0 psig). The current used was 13 A and the voltage was allowed to vary. The system was run for six hours after the power was turned on. The initial temperature of the system was 27.6° C. and was allowed to rise to 38.6° C. as a result of the heat produced by the system.

Initially, the acid compartments were filled with a solution that was 0.14N in HCl, the base compartments with a solution 0.14N in NaOH and the salt compartment with a solution 2.04N in MCl/M$_2$SO$_4$. The circulation rates, that is the rates at which solutions are circulated through the membrane compartments and the corresponding recirculation tanks were adjusted at 1.02, 0.64 and 0.35 L/min. in the acid, base and salt compartments, respectively, in order to maintain the hydraulic pressure in all compartments the same at 55 kPa. The initial loop volumes in the three compartments were 7.3, 7–5 and 7.0 liters for the acid, base and salt compartments, respectively. At time intervals during the run, small samples were taken from the reservoirs of the three compartments and analyzed for acid and base content as well as sodium, potassium, chloride and sulphate contents.

Table V demonstrates the changes in the concentrations of sodium hydroxide in the base compartment, hydrochloric acid in the acid compartment and sodium chloride, sodium sulphate and sodium hydroxide in the salt compartment once the power was turned on and the system allowed to run for 120 minutes.

TABLE V

| | Salt | | | Acid | | | Base |
|---|---|---|---|---|---|---|---|
| Time Min | MCl N | M$_2$SO$_4$ N | K$^+$/Na$^+$ | MOH N | HCl N | H$_2$SO$_4$ N | MOH N |
| 0 | 0.553 | 1.58 | 0.090 | — | 0.160 | 0.006 | 0.142 |
| 40 | 0.455 | 1.58 | 0.087 | 0.0165 | 0.270 | 0.032 | 0.309 |
| 80 | 0.331 | 1.53 | 0.081 | 0.0155 | 0.379 | 0.080 | 0.446 |
| 120 | 0.240 | 1.55 | 0.077 | 0.0125 | 0.466 | 0.140 | 0.627 |

As shown in Table V the concentration of sodium/potassium chloride in the salt compartments decreased over the duration of the experiment from 0.553N to 0.240N while the concentration of potassium/sodium sulphate in the same solution declined only slightly to 1.55N from 1.58N. During this time period the concentration of sodium/potassium hydroxide in the base compartment increased from 0.142N to 0.627N; this indicates that alkali metal ions are crossing the cation-selective membranes thus moving from the salt into the base compartments. It is also shown in Table V that the concentration of hydrochloric acid in the acid compartments increased over the duration of the experiment from 0.160N to 0.466N while the concentration of sulphuric acid increased only slightly from 0.006N to 0.14N; this indicates that chloride anions were preferentially transferred through the monovalent anion-selective membranes, as compared to sulphate ions, thus moving from the salt into the acid compartments. The concentrations of chloride and sulphate in the base compartment increased from 0.0021N to 0.0033N and from 0.0001N to 0.0002N, respectively; this suggests that very small amounts of chloride and sulphate end up in this compartment, thereby leading to the production of base of exceptionally high purity. The concentration of salt in the acid compartment increased from 0.001 to 0.003N indicating that the acid obtained is of exceptionally high purity as well. The declining concentration of sodium hydroxide in the salt compartment is likely to be due to the back-diffusion of acid from the acid to the salt compartment.

Table V also shows that sodium and potassium ions in the salt compartment are being removed at different rates. The ratio of potassium to sodium changes from 0.090 at the beginning of the experiment to 0.077 at the end of the experiment, indicating that potassium is being transferred to the base compartment at a faster rate than sodium; this occurs despite the significantly higher concentration of sodium as compared to potassium at the beginning of the experiment. The preferential transfer of potassium over sodium through cation-exchange membranes has been observed by a number of investigators (Gavach, C. et al., J. Electroanal. Chem., 190, 33–45 (1985); Pusch, W., Desalination, 83, 261–270, (1991); Xue, T. et al., J. Membr. Sci., 58, 175–189 (1991). It has been shown that the mobility of $K^+$ ($4.3 \times 10^{-6}$ $cm^2$ $s^{-1}$ $V^{-1}$) across a cation-selective membrane such as Nafion is higher than that of $Na^+$ ($3.24 \times 10^{-6}$ $cm^2$ $s^{-1}$ $V^{-1}$) (Norian, K. H., J. Mater. Sci. Lett., 12:5, 320–321 (1993). This finding does not make sense if one considers the bare ionic radii of $Na^+$(0.96 Å) and $K^+$(1.33 Å) but does if one considers the ionic radii of the hydrated alkali ions which are 2.76 Å for $Na^+$ and 2.32 Å for $K^+$(Zaluski, C. S. and Xu, G., J. Electrochem. Soc., 141(2) (1994)).

The $K^+$ and $Na^+$ ions are transferred to the base compartment, producing a mixture of KOH and NaOH which should pose no problem in bleaching. If the bleach plant effluent is not recycled, a partial purge of potassium will thus be achieved. If the bleach plant effluent is recycled, the potassium ions would have to be removed by ion-exchange resins preferentially. selective to potassium (e.g., Belfer, S. et al., Reactive Polymers, 14:1, pp.81–84 (1991)) prior to the treatment of ESP catch using Bipolar Membrane Electrodialysis or Electrodialysis.

Table VI presents the current efficiencies obtained for the transport of alkali metals ($Na^+$ and $K^+$) to the base compartment and the transport of $Cl^-$ and $SO_4^{2-}$ to the acid compartment in the duration of the experiment.

TABLE VI

| Time | Current Efficiency % | | | |
|---|---|---|---|---|
| min. | $Na^+$ | $K^+$ | $Cl^-$ | $SO_4^{2-}$ |
| 0–40 | 85.6 | 7.8 | 67.8 | 14.7 |
| 40–80 | 83.4 | 8.0 | 58.0 | 27.1 |
| 80–120 | 83.0 | 7.0 | 53.2 | 33.9 |

As shown in Table VI, the sodium ion current efficiency is about 83% and for potassium about 7.5%. For the chloride ion, the current efficiency declined from 67.8% to 53.2% whereas for sulphate it increased from 14.7% to 33.9%. The reason for the declining current efficiencies for chloride is likely to be the declining concentration of alkali metal chlorides in the salt compartment (see Table V) over the duration of the experiment. It appears from this data that in the absence of sufficiently high chloride levels in the salt compartment, sulphate ions are transported to the acid compartment thus carrying an increasingly larger portion of the current.

Example 2

The experiment described in Example 2 is a continuation of experiment 1 except that the salt compartment was allowed to become acidic as a result of the back-diffusion of acid from the acid to the salt compartments. The cell of FIG. 1 referred to in example 1 was also used in example 2. Table VII demonstrates the changes in the concentrations of sodium/potassium hydroxide in the base compartment, hydrochloric acid in the acid compartment and sodium/potassium chloride, sodium/potassium sulphate and acid in the salt compartment once the system was allowed to run for an additional 250 minutes.

TABLE VII

| | Salt | | | | Acid | | Base |
|---|---|---|---|---|---|---|---|
| Time Min | MCl N | $M_2SO_4$ N | $K^+/Na^+$ | Acid N | HCl N | $H_2SO_4$ N | MOH N |
| 160 | 0.169 | 1.48 | 0.072 | 0.010 | 0.516 | 0.209 | 0.772 |
| 220 | 0.102 | 1.29 | 0.059 | 0.055 | 0.581 | 0.341 | 0.990 |
| 280 | 0.061 | 1.20 | 0.056 | 0.126 | 0.604 | 0.500 | 1.20 |
| 340 | 0.036 | 1.10 | 0.048 | 0.187 | 0.614 | 0.620 | 1.38 |
| 370 | 0.027 | 0.90 | 0.044 | 0.216 | 0.614 | 0.660 | 1.45 |

As shown in Table VII, the concentration of sodium/potassium chloride in the salt compartments continues to decrease over the duration of this experiment from 0.169N to 0.027N while the concentration of sodium/potassium sulphate in the same solution decreased from 1.48N to 0.90N. During this time period the concentration of sodium/potassium hydroxide in the base compartment increased from 0.772N to 1.45N; this indicates that alkali metal ions continue to cross the cation-selective membranes thus moving from the salt into the base compartments. It is also shown in Table VII that the concentration of hydrochloric acid in the acid compartments increased only slightly over the duration of the experiment from 0.516N to 0.614N while the concentration of sulphuric acid increased significantly from 0.209N to 0.660N; this indicates that in the absence of high levels of chloride, and under the acidic conditions of the salt compartment, sulphate (probably in the bisulphate form) ions are mostly transferred through the monovalent anion-selective membranes, thus moving from the salt into the acid compartments. The concentrations of chloride and sulphate in the base compartment increased from 0.0041N to 0.013N and from 0.0004N to 0.0021N, respectively; this suggests that very small amounts of chloride and sulphate end up in this compartment, thereby leading to the continued production of base of exceptionally high purity. The concentration of salt in the acid compartment increased from 0.005 to 0.021N indicating that the acid obtained continues to be of exceptionally high purity as well. The increasing concentration of acid in the salt compartment is likely to be due to the back-diffusion of acid from the acid to the salt compartment.

Table VIII presents the current efficiencies obtained for the transport of alkali metal ions ($Na^+$ and $K^+$) to the base compartment and the transport of $Cl^-$ and $SO_4^{2-}$ to the acid compartment in the duration of the experiment.

TABLE VIII

| Time | Current Efficiency, % | | | |
|---|---|---|---|---|
| min. | $Na^+$ | $K^+$ | $Cl^-$ | $SO_4^{2-}$ |
| 120–160 | 82.5 | 7.6 | 30.4 | 38.1 |
| 160–220 | 81.7 | 6.3 | 24.7 | 48.1 |
| 220–280 | 82.9 | 6.0 | 14.4 | 57.5 |
| 280–340 | 77.0 | 5.8 | 5.2 | 44.0 |

As shown in Table VIII the sodium ion current efficiency remains at about 80% and for potassium at about 6%. The total current efficiency for alkali metal ion transport remains at about 85% throughout the duration of the experiment which suggests that the back-diffusion of acid into the salt compartment does not affect alkali metal ion transport into the base compartment; this is likely to be due to the buffering of free hydrogen ions in the salt solution through the conversion of sulphate ions to bisulphate ions. For the chloride ion, the current efficiency declined from 30.4% to 5.2% whereas for sulphate it increased from 38.1% to 57.5% but then declined to 44.0%. The reason for the declining current efficiencies for chloride is likely to be the declining concentration of alkali metal chlorides in the salt compartment (see Table VII) over the duration of the experiment. An additional reason may be the back-diffusion of acid into the salt compartment which leads to the conversion of a portion of the divalent sulphate ions in the salt compartment to the monovalent bisulphate form which is expected to be transported quite easily through the monovalent anion-selective membranes.

Example 3

The experiment described in Example 3 was conducted under similar conditions as the experiments described in Examples 1 and 2 except that Neosepta ACS monovalent anion-selective membranes were used- The cell of FIG. 1 referred to in Examples 1 and 2 was also used in Example 3.

Initially, the acid compartments were filled with a solution that was 0.22N in HCl, the base compartments with a solution 0.22N in NaOH and the salt compartment with a solution 2.7N in $NaCl/Na_2SO_4$. The initial loop volumes in the three compartments were 5.0, 5.0 and 8.0 liters for the acid, base and salt compartments, respectively. At time intervals during the run small samples were taken from the reservoirs of the three compartments and analyzed for acid and base content as well as sodium, potassium, chloride and sulphate contents. The current used was 7 A and the voltage was allowed to vary. The system was run for six hours after the power was turned on. The initial temperature of the system was 23.1° C. and was allowed to rise to 32.0° C. as a result of the heat produced by the system.

Table IX demonstrates the changes in the concentrations of sodium hydroxide in the base compartment, hydrochloric and sulphuric acid in the acid compartment and sodium chloride, sodium sulphate and acid in the salt compartment once the power was turned on and the system allowed to run for 360 minutes.

TABLE IX

| | Salt | | | Acid | | Base |
|---|---|---|---|---|---|---|
| Time Min | NaCl N | $Na_2SO_4$ N | Acid N | HCl N | $H_2SO_4$ N | NaOH N |
| 0 | 0.300 | 1.16 | 0.00 | 0.190 | 0.020 | 0.220 |
| 60 | 0.270 | 1.15 | 0.00 | 0.260 | 0.030 | 0.410 |
| 120 | 0.210 | 1.13 | 0.02 | 0.350 | 0.070 | 0.610 |
| 180 | 0.170 | 1.13 | 0.02 | 0.410 | 0.110 | 0.780 |
| 240 | 0.130 | 1.11 | 0.04 | 0.470 | 0.160 | 0.950 |
| 300 | 0.100 | 1.15 | 0.08 | 0.500 | 0.230 | 1.120 |
| 360 | 0.070 | 1.13 | 0.10 | 0.540 | 0.320 | 1.280 |

As shown in Table IX, the concentration of sodium chloride in the salt compartments decreased over the duration of the experiment from 0.300N to 0.070N while the concentration of sodium sulphate in the same solution declined only slightly, if at all, to 1.13N from 1.16N. During this time period the concentration of sodium hydroxide in the base compartment increased from 0.220N to 1.28N; this indicates that sodium ions are crossing the cation-selective membranes thus moving from the salt into the base compartments. It is also shown in Table IX that the concentration of hydrochloric acid in the acid compartments increased over the duration of the experiment from 0.190N to 0.54N while the concentration of sulphuric acid increased from 0.020N to 0.32N; this indicates that chloride anions were preferentially transferred through the monovalent anion-selective membranes, as compared to sulphate ions, thus moving from the salt into the acid compartments. The increasing concentration of titratable acid in the salt compartment is likely to be due to the back-diffusion of acid from the acid to the salt compartment.

Table X presents the current efficiencies obtained for the transport of $Na^+$ to the base compartment and the transport of $Cl^-$ and $SO_4^{2-}$ to the acid compartment in the duration of the experiment.

TABLE X

| Time | Current Efficiency, % | | |
|---|---|---|---|
| min. | $Na^+$ | $Cl^-$ | $SO_4^{2-}$ |
| 0–60 | 92.3 | 66.3 | 16.2 |
| 60–120 | 92.0 | 43.9 | 20.7 |
| 120–180 | 91.7 | 27.4 | 21.3 |
| 180–240 | 78.2 | 26.7 | 26.9 |
| 240–300 | 79.3 | 21.0 | 31.1 |
| 300–360 | 79.4 | 21.1 | 59.5 |

As shown in Table X the sodium ion current efficiency declines only slightly and is on the average about 85%; this suggests that the back-diffusion of acid into the salt compartment does not much affect sodium transport into the base compartment; this is likely to be due to the removal of free hydrogen ions from the salt solution through the conversion of sulphate ions to bisulphate ions. For the chloride ion the current efficiency declined from 66.3% to 21.1% whereas for sulphate it increased from 16.2% to 59.5%. The reason for the declining current efficiencies for chloride is likely to be the declining concentration of sodium chloride in the salt compartment (see Table IX) over the duration of the experiment. It appears from this data that in the absence of sufficiently high chloride levels in the salt compartment, sulphate ions are transported to the acid compartment thus carrying an increasingly larger portion of the current. An additional reason may be the back-diffusion of acid into the salt compartment which leads to the conversion of a portion of the divalent sulphate ions in the salt compartment to the monovalent bisulphate form which is expected to be transported quite easily through the monovalent anion-selective membranes.

Example 4

The cell of FIG. 1, referred to in examples 1–3, was also used in example 4. In this case, however, all three compartments were operated in the feed and bleed mode. Table XI shows the conditions used for the operation of the cell stack.

TABLE XI

|  | Acid | Base | Salt |
| --- | --- | --- | --- |
| Initial Concentration, N |  |  |  |
| NaOH | 0.00 | 0.88 | 0.000 |
| HCl | 0.147 | 0.00 | 0.0035 |
| $Na_2SO_4$ | 0.011 | 0.00 | 1.15 |
| NaCl | 0.011 | 0.00 | 0.175 |
| Feed Solution Conc., N |  |  |  |
| NaOH | 0.00 | 0.00 | 0.00 |
| HCl | 0.00 | 0.00 | 0.00 |
| $Na_2SO_4$ | 0.00 | 0.00 | 1.20 |
| NaCl | 0.00 | 0.00 | 0.30 |
| Feed Rate, mL/min | 33.5 | PID | 40.0 |

Initially, the acid compartments were filled with a solution 0.147N in HCl, whereas the base compartments were filled with a 0.88N sodium hydroxide solution. The salt compartments were filled with a solution 1.15N in $Na_2SO_4$ and 0.175N in NaCl. The feed solution for the salt compartments was a simulated ESP catch solution (1.2N $Na_2SO_4$ and 0–3N NaCl). The feed solution for the base and acid compartments was water. The feed rates into the acid and salt compartments were 33.5 and 40.0 mL/min, respectively. The feed rate of water into the base compartment was continuously adjusted through PID control to produce the desired concentration of base. These particular rates were chosen in order to achieve the desired concentrations of product from the acid and base compartments as well as the desired level of removal of chloride from the salt compartment. The electrical input was 13 amps and the voltage across the 4 unit BME cells 12.7 V. Small samples from the reservoirs of the acid, base, and salt compartments were taken at intervals and analyzed for acid, base, sodium, chloride and sulphate.

TABLE XII

|  | Acid | Base | Salt |
| --- | --- | --- | --- |
| Bleed Solution Concentration, N |  |  |  |
| NaOH | 0.00 | 0.98 | 0.00 |
| HCl | 0.145 | 0.00 | — |
| $H_2SO_4$ | 0.200 | 0.00 | — |
| $Na_2SO_4$ | — | — | 1.13 |
| NaCl | — | — | 0.185 |

TABLE XII-continued

|  | Acid | Base | Salt |
| --- | --- | --- | --- |
| Bleed Rate, mL/min | 35.5 | 29.5 | 35.2 |
| Actual Bleed Rate, meq/min |  |  |  |
| NaOH | 0.00 | 28.91 | 0.00 |
| HCl | 5.15 | 0.00 | — |
| $H_2SO_4$ | 7.10 | 0.00 | — |
| $Na_2SO_4$ | — | — | 39.8 |
| NaCl | — | — | 6.51 |

As shown in Table XII, the bleed solution from the acid compartments was 0.145N in HCl and 0.20N in $H_2SO_4$ produced at the rate of 35.5 mL/min; this corresponds to the production of 5.15 meq/min of HCl and 7.10 meq/min of $H_2SO_4$ from the acid compartment. A 0.98N solution of sodium hydroxide was produced from the base compartments at the rate of 29.5 mL/min; this corresponds to the production of 28.1 meq/min of sodium hydroxide. The concentration of the bleed solution from the base compartment was specifically adjusted to be 0.98N in order to demonstrate that it can be of a concentration that can be used directly in the bleaching of chemical pulps, The bleed solution from the salt compartment was 1.13N in $Na_2SO_4$ and 0.185N in NaCl at a rate of 35.2 mL/min; this solution is sufficiently depleted in sodium chloride to be used as make-up in the recovery cycle. These figures suggest that $Na^+$ ions are crossing the cation-selective membranes and entering the base compartments while the $Cl^-$ and $HSO_4^-$ ions are crossing the anion-selective membranes and entering the acid compartments.

Example 5

The two-compartment water-splitting cell shown in FIG. 3 was used to demonstrate that sodium chloride can be removed from a solution of pre-treated ESP catch while simultaneously being split into hydrochloric acid and sodium hydroxide, which remains in the same stream as the sodium sulphate depleted in sodium chloride. A pilot cell stack consisting of eight, 2-compartment unit cells arranged between two electrodes was used. The arrangement of the cell is illustrated in FIG. 3. For simplicity this figure shows only one cell with electrodes on either side. The bipolar membranes were WSI 4010/1030 membranes and the anion-selective membranes were Asahi Glass Selemion ASV monovalent anion-selective membranes. The cation-selective membranes used in the electrode rinse compartments were Nafion 417. Each membrane had an exposed area of 91 $cm^2$. A 10% NaOH hydroxide solution was fed to the compartments adjacent to the anode and the cathode from a reservoir and returned to the reservoir, after degassing to remove hydrogen and oxygen. Each cell compartment was connected to its appropriate reservoir tank and all compartments operated in the batch mode. Table XIII shows the conditions used for the operation of the cell stack.

TABLE XIII

|  | Salt/Base | Acid HCl |
|---|---|---|
| Initial Concentration in Loop, N |  |  |
| Na₂SO₄ | 0.859 | 0.141 |
| NaCl | 0.853 |  |
| Initial Volume in Loop, L | 8.06 | 7.76 |
| Circulation Rate, L/min | 3.5 | 2.8 |
| Hydraulic Pressure, kPa | 65 | 65 |

The various loops were filled with the indicated solutions to maintain high conductivity in all the solutions during the initial stages of the run. The current used was 13 A and the voltage was allowed to vary. The system was run for five hours after the power was turned on. -The initial temperature of the system was 26.9° C. and was allowed to rise to 39.4° C. as a result of the heat produced by the system.

Initially, the acid compartments were filled with a solution that was 0.141N in HCl and the salt/base compartments with a solution 0.859N in $Na_2SO_4$ and 0.853N in NaCl. The circulation rates, that is the rates at which solutions are circulated through the membrane compartments and the corresponding recirculation tanks were adjusted at 3.5 and 2.8 L/min in the salt/base and acid compartments, respectively, in order maintain the hydraulic pressure in all compartments the same at 65 kPa. The initial loop volumes in the three compartments were 8.06 and 7.76 L for the salt/base and acid compartments, respectively. At time intervals during the run, small samples were taken from the reservoirs of the two compartments and analyzed for acid and base content as well as sodium, chloride and sulphate contents.

Table XIV demonstrates the changes in the concentrations of sodium sulphate, sodium chloride and sodium hydroxide in the salt/base compartment and hydrochloric acid in the acid compartment once the power was turned on and the system allowed to run for five hours.

TABLE XIV

| | Salt/Base | | | Acid | | |
|---|---|---|---|---|---|---|
| Time min | NaCl N | Na₂SO₄ N | NaOH N | H⁺ N | Cl⁻ N | SO₄²⁻ N |
| 0 | 0.853 | 0.859 | 0.00 | 0.141 | 0.199 | 0.0149 |
| 60 | 0.483 | 0.865 | 0.320 | 0.493 | 0.598 | 0.0254 |
| 120 | 0.196 | 0.892 | 0.602 | 0.732 | 0.874 | 0.0422 |
| 180 | 0.0740 | 0.869 | 0.755 | 0.830 | 0.987 | 0.0730 |
| 240 | 0.0326 | 0.833 | 0.836 | 0.859 | 0.994 | 0.119 |
| 300 | 0.0202 | 0.821 | 0.900 | 0.868 | 0.990 | 0.151 |

As shown in Table XIV, the concentration of sodium chloride in the salt/base compartments decreased over the duration of the experiment from 0.853N to 0.0202N while the concentration of sodium sulphate in the same solution declined only slightly to 0.821N from 0.859N. During this time period the concentration of sodium hydroxide in the salt/base compartment increased from 0.00N to 0.900N. It is also shown in Table XIV that the concentration of acid in the acid compartments increased over the duration of the experiment from 0.141N to 0.868N. During this time period the concentration of chloride in this compartment increased from 0.199N to 0.990N while the concentration of sulphate increased only slightly from 0.0149N to 0.151N; this indicates that chloride anions were preferentially transferred through the monovalent anion-selective membranes, as compared to sulphate ions, thus moving from the salt/base into the acid compartments.

Table XV presents the current efficiencies obtained for the transport of chloride and sulphate ions to the acid compartment as well as the current efficiency of acid production in this compartment and base in the salt/base compartments in the duration of the experiment.

TABLE XV

| Time | Current Efficiency, % | | | |
|---|---|---|---|---|
| min. | NaOH | H⁺ | Cl⁻ | SO₄²⁻ |
| 0–60 | 98.0 | 92.7 | 100 | 2.39 |
| 60–120 | 58.6 | 58.5 | 68.7 | 2.49 |
| 120–180 | 29.7 | 32.0 | 32.2 | 4.45 |
| 180–240 | 9.48 | 13.0 | 6.55 | 5.88 |
| 240–300 | 8.76 | 6.21 | 7.51 | 7.06 |

As shown in Table XV, the chloride ion current efficiency is on the average much higher than that of sulphate. For the chloride ion, the current efficiency was initially very high (100%) and slowly declined to about 7% by the end of the experiment. In the case of sulphate the current efficiency was initially very low (2.39%) and slowly increased to about 7% by the end of the experiment. The reason for the declining current efficiencies for chloride is likely to be the declining concentration of chloride in the salt/base compartment (see Table XIV) over the duration of the experiment. It appears from these data that in the absence of sufficiently high chloride levels in the salt/base compartment, hydroxide ions and not sulphate ions are transported to the acid compartment thus carrying an increasingly larger portion of the current. This is evident from the declining current efficiencies for the production of sodium hydroxide in the salt/base compartment and for the production of acid in the acid compartment. The rise in the sulphate current efficiencies is not sufficiently high to account for all the current going through the system. This is likely to be the case because under the increasingly alkaline conditions of the salt/base compartment the sulphate ions are exclusively in their divalent state and, therefore, cannot penetrate the monovalent anion-selective membrane.

Example 6

The two-compartment ED cell shown in FIG. 5 was used to demonstrate how a solution of simulated ESP catch can be depleted of sodium chloride. A pilot cell stack consisting of four, 2-compartment unit cells arranged between two electrodes was used. The arrangement of the cell is illustrated in FIG. 5. For simplicity this figure shows only one cell with electrodes on either side. The cation-selective membranes were Asahi Glass Selemion CMV membranes and the anion-selective membranes were Asahi Glass Selemion ASV monovalent anion-selective membranes. The cation-selective membranes used in the electrode rinse compartments were Nafion 417. Each membrane had an exposed area of 91 cm². A 10% sodium hydroxide solution was fed to the compartments adjacent to the anode and the cathode from a reservoir and returned to the reservoir, after degassing to remove hydrogen and oxygen. Each cell compartment was connected to its appropriate reservoir tank and all compartments operated in the batch mode. Table XVI shows the conditions used for the operation of the cell stack.

TABLE XVI

|  | Diluting | Concentrating |
|---|---|---|
| Initial Concentration in Loop, N |  |  |
| Na₂SO₄ | 1.0 | 0.0 |
| NaCl | 0.9 | 0.60 |
| Initial Volume in Loop, L | 8.0 | 8.0 |
| Circulation Rate, L/min | 1.63 | 2.04 |
| Hydraulic Pressure, psig | 8.7 | 9.2 |

Initially, the concentrating compartments were filled with a solution that was 0.6N in NaCl and the diluting compartments with a solution 1N in $Na_2SO_4$ and 0.9N in NaCl. The circulation rates, that is the rates at which solutions are circulated through the membrane compartments and the corresponding recirculation tanks were adjusted at 1.63 and 2.04 L/min in the diluting and concentrating compartments, respectively, in order to maintain the hydraulic pressure in both compartments the same at about 9 psig. The initial loop volumes in both compartments were 8.0 liters. At time intervals during the run small samples were taken from the reservoirs of the two compartments and analyzed for sodium, chloride and sulphate content. The current used was 13 A and the voltage was allowed to vary. The initial temperature of the system was 25.0° C. and was allowed to rise to 37.2° C. as a result of the heat produced by the system.

Table XVII demonstrates the changes in the concentrations of sodium chloride in the concentrating compartments, and sodium chloride as well as sodium sulphate in the diluting compartments once the power was turned on and the system allowed to run for 390 minutes.

TABLE XVII

|  | Diluting | | Concentrating | |
|---|---|---|---|---|
| Time Min | NaCl N | Na₂SO₄ N | NaCl N | Na₂SO₄ N |
| 0 | 0.91 | 0.921 | 0.61 | 0.003 |
| 30 | 0.83 | 0.918 | 0.69 | 0.007 |
| 90 | 0.66 | 0.888 | 0.86 | 0.017 |
| 150 | 0.47 | 0.959 | 1.02 | 0.026 |
| 210 | 0.33 | 0.983 | 1.12 | 0.042 |
| 270 | 0.20 | 0.978 | 1.21 | 0.076 |
| 360 | 0.09 | 0.907 | 1.25 | 0.152 |
| 390 | 0.07 | 0.898 | 1.24 | 0.174 |

As shown in Table XVII, the concentration of sodium chloride in the diluting compartments decreased over the duration of the experiment from 0.91N to 0.07N while the concentration of sodium sulphate in the same solution declined only slightly to 0.898N from 0.921N. During this time period the concentration of sodium chloride in the concentrating compartments increased from 0.61N to 1.24N while the concentration of sodium sulphate in the same compartment increased only slightly from 0.003N to 0.174N; these results indicate that sodium ions are crossing the cation-selective membranes thus moving from the diluting into the concentrating compartments; similarly chloride ions are preferentially transferred, as compared to sulphate ions, from the diluting into the concentrating compartments.

Table XVIII presents the current efficiencies obtained for the transport of $Na^+$, $Cl^-$ and $SO_4^{2-}$ ions from the diluting to the concentrating compartments in the duration of the experiment.

TABLE XVIII

| Time | Current Efficiency, % | | |
|---|---|---|---|
| min. | Na⁺ | Cl⁻ | SO₄²⁻ |
| 0–30 | 94.9 | 74.7 | 3.5 |
| 30–90 | 82.5 | 81.8 | 4.7 |
| 90–150 | 77.5 | 77.9 | 4.0 |
| 150–210 | 83.7 | 58.1 | 7.6 |
| 210–270 | 88.7 | 54.1 | 15.7 |
| 270–360 | 76.6 | 25.3 | 24.8 |

As shown in Table XVIII, over the duration of the experiment the sodium ion current efficiency declined to 76.6%. For the chloride ion the current efficiency declined from 74.7% to 25.3% whereas for sulphate it increased from 3.5% to 24.8%. The reason for the declining current efficiencies for chloride is likely to be the declining concentration of sodium chloride in the salt compartment (see Table XVII) over the duration of the experiment. It appears from these data that in the absence of sufficiently high chloride levels in the diluting compartment, sulphate ions are transported to the concentrating compartment thus carrying an increasingly larger portion of the current.

Example 7

The cell of FIG. 5 referred to in example 6, was also used in example 7. In this case, however, both the diluting and concentrating compartments were run in the feed and bleed mode. Table XIX shows the conditions used for the operation of the cell stack.

TABLE XIX

|  | Diluting | Concentrating |
|---|---|---|
| Initial Concentration, N |  |  |
| Na₂SO₄ | 0.951 | 0.003 |
| NaCl | 0.430 | 0.420 |
| Circulation Rate, L/min | 1.28 | 1.96 |
| Feed Solution Conc., N |  |  |
| Na₂SO₄ | 0.924 | 0.00 |
| NaCl | 0.908 | 0.00 |
| Feed Rate, mL/min | 29.4 | 33.3 |

Initially, the diluting compartments were filled with a solution 0.43N in NaCl and 0.951N in $Na_2SO_4$, whereas the concentrating compartments were filled with a 0.42N sodium chloride solution. The feed solution for the diluting compartments was a simulated ESP catch solution (0.924N $Na_2SO_4$ and 0.908N NaCl). The feed Solution for the concentrating compartments was water. The feed rates into the diluting and concentrating compartments were 29.4 and 33.3 mL/min, respectively. These particular rates were chosen in order to achieve the desired concentrations of product from the concentrating compartment as well as the desired level of removal of chloride from the diluting compartments (about 50%). The circulation rates, that is the rates at which solutions are circulated through the membrane compartments and the corresponding recirculation tanks, were adjusted at 1.28 and 1.96 L/min in the diluting and concentrating compartments, respectively. The current was set at 6 A (65 mA/cm²) and the voltage across the 4 unit ED cells was about 2.4 V. Small samples from the reservoirs of the diluting and concentrating compartments were taken at intervals and analyzed for sodium, chloride and sulphate. On the basis of these analyses current efficiencies were calculated. Constant current efficiencies of about 96.5% for $Na^+$, 88.4% for chloride and 5.0% for sulphate were obtained.

TABLE XX

|  | Diluting | Concentrating |
|---|---|---|
| Bleed Solution Concentration, N |  |  |
| $Na_2SO_4$ | 0.967 | 0.0083 |
| NaCl | 0.408 | 0.42 |
| Bleed Rate, mL/min | 25.9 | 37.5 |
| Actual Bleed Rate, meq/min |  |  |
| $Na_2SO_4$ | 25.0 | 0.33 |
| NaCl | 10.6 | 15.8 |

As shown in Table XX, the bleed solution from the concentrating compartments was 0.42N in NaCl and 0.0083N in $Na_2SO_4$ produced at the rate of 37.5 mL/min; this corresponds to the production of 15.8 meq/min of NaCl and 0.33 meq/min of $Na_2SO_4$ from the concentrating compartments. A solution 0.967N in $Na_2SO_4$ and 0.408N in NaCl was produced from the diluting compartments at the rate of 25.9 mL/min; this corresponds to the production of 25 meq/min of $Na_2SO_4$ and 10.6 meq/min of NaCl. This solution is sufficiently depleted in sodium chloride to be used as make-up in the recovery cycle of coastal and/or closed-cycle kraft mills. These results indicate that sodium ions are crossing the cation-selective membranes and entering the concentrating compartments; similarly, chloride ions are preferentially transferred, as compared to sulphate ions, from the diluting into the concentrating compartments.

We claim:

1. A single-stage electrodialysis process comprising:
   (a) providing a cell comprising an anode, a cathode and at least two compartments therebetween separated by a monovalent anion-selective membrane,
   (b) feeding an aqueous solution of a mixture of alkali metal salts of monovalent chloride anions and polyvalent anions into a first of said compartments to contact a first side of said monovalent anion-selective membrane, said solution being substantially free of polyvalent metal ions,
   (c) feeding a liquid comprising water into a second of said compartments to contact a second side of said monovalent anion-selective membrane,
   (d) passing a direct current through said cell between the anode and cathode to effect migration of monovalent chloride anions from said first compartment through said monovalent anion-selective membrane into said second compartment, and
   (e) recovering a solution of alkali metal salts of the polyvalent anions depleted in salts of the monovalent chloride anions from said first compartment.

2. A process according to claim 1, wherein said solution in step (b) comprises alkali metal chloride and sulphate.

3. A process according to claim 2, wherein said solution in step (b) is a solution of the catch of Electrostatic Precipitator (ESP) of a kraft pulp mill chemical recovery boiler.

4. A single stage electrodialysis process according to claim 1, comprising:
   (a) providing a cell comprising an anode, a cathode and at least two compartments there-between defined at least in part by a monovalent anion-selective membrane and two bipolar membranes, said bipolar membranes having a cation-selective side facing said cathode and anion-selective side facing said anode,
   (b) feeding an aqueous solution of a mixture of salts MA and $M_xB$ monovalent and polyvalent anions into a first of said compartments to contact a first side of said anion-selective membrane and an anion-selective side of a first of said bipolar membranes, wherein M is an alkali metal cation, A is a monovalent chloride anion, B is a multivalent anion and x is the valency of the multivalent anion, said solution being substantially free of polyvalent metal ions,
   (c) feeding liquid comprising water into a second of said compartments to contact a second side of said monovalent anion-selective membrane and a cation-selective side of a second of said bipolar membranes,
   (d) passing a direct current through said water splitter thereby causing the transfer of monovalent chloride anions A from said salt solution in the first compartment to the second compartment and their replacement by hydroxide ions from the first bipolar membrane,
   (e) removing a solution depleted in MA but not $M_xB$ and enriched in MOH from said first compartment,
   (f) removing accumulated HA from said second compartment.

5. A process according to claim 4, wherein said cell has a plurality of units, each unit having two compartments comprising a salt/base compartment defined between a first side of said monovalent anion-selective membrane and the anion-selective side of a first bipolar membrane, and an acid compartment defined between a second side of said monovalent anion-selective membrane and the cation-selective side of a second said first bipolar membrane; said solution in step (b) being fed to said salt/base compartment and said liquid in step (c) being fed to said acid compartment, said first compartment being said salt/base compartment and said second compartment being said acid compartment.

6. A process according to claim 4, wherein said aqueous solution in (b) is a solution of the catch of the Electrostatic Precipitator (ESP) of a kraft pulp mill chemical recovery boiler.

7. A process according to claim 4, wherein hydrochloric acid solution is removed in step f) from said second compartment, and further including:
   A) feeding said hydrochloric acid solution to a cation-exchange column in the sodium ion form resulting in a regenerated column in the hydrogen ion form and a sodium chloride solution,
   B) feeding said sodium chloride solution into a sodium chlorate plant for the production of a sodium chlorate solution,
   C) feeding said sodium chlorate solution back into the cation-exchange column, in a separate step from A), for the production of a solution mainly composed of chloric acid,
   D) feeding said chloric acid solution into a chlorine dioxide generator for the production of chlorine dioxide,
   E) feeding said chlorine dioxide to one or more chemical pulp bleaching stages for the production of bleached kraft pulps and chlorinated bleaching effluents,
   F) feeding said chlorinated bleaching effluents to a recovery system of a mill for their conversion to carbon dioxide, water and sodium chloride,
   G) directing said sodium chloride to the ESP of a chemical recovery boiler where it is captured along with sodium sulphate in the solid form,
   H) dissolving the sodium chloride/sodium sulphate solid mixture from G) in water, pretreating and feeding the resulting solution to step b) for the production of a sodium/potassium sulphate/-hydroxide solution, partially or fully depleted in chloride and potassium; and hydrochloric acid which is directed to step A).

8. A process according to claim 1, wherein said cell is a three-compartment cell comprising an acid compartment defined between said monovalent anion-selective membrane and a cation-selective side of the first bipolar membrane; a salt compartment defined between said monovalent anion-selective membrane and a cation-selective membrane; and a base compartment defined between said cation-selective membrane and an anion selective side of a second of said bipolar membranes; said solution in step (b) being fed to said salt compartment; said liquid comprising water in step (c) being fed into said acid compartment and further including feeding a liquid comprising water into said base compartment.

9. A process according to claim 8, wherein said aqueous solution in (b) is an Electrostatic Precipitator (ESP) catch solution.

10. A process according to claim 9, wherein said ESP solution contains at least one alkali metal cation selected from sodium and potassium ions; chloride ions and sulphate ions.

11. A single stage electrodialysis process according to claim 1, comprising:
 (a) providing a cell comprising an anode, a cathode and at least three compartments therebetween defined at least in part by a monovalent anion-selective membrane, a cation-selective membrane and two bipolar membranes, said bipolar membranes having a cation-selective side facing said cathode and anion-selective side facing said anode,
 (b) feeding an aqueous solution of a mixture of salts MA and $M_xB$ of monovalent and polyvalent anions into a first of said compartments to contact a first side of said cation-selective membrane and a first side of said anion-selective membrane wherein M is an alkali metal cation, A is a monovalent chloride anion, B is a multivalent anion and x is the valency of the multivalent anion, said solution being substantially free of polyvalent metal ions;
 (c) feeding liquid comprising water into a second of said compartments to contact a cation-selective side of a said first bipolar membrane and a second side of said monovalent anion-selective membrane,
 (d) feeding liquid comprising water into a third of said compartments to contact an anion-selective side of a said second bipolar membrane and a second side of said cation-selective membrane,
 (e) passing a direct current through said cell between the anode and cathode to effect:
  (i) migration of said monovalent anions A from said first compartment through said monovalent anion-selective membrane into said second compartment,
  (ii) migration of said alkali metal cations M from said first compartment through said cation-selective membrane into said third compartment,
  splitting of water by said bipolar membranes of said second and third compartments with accumulation of hydrogen ions along with the monovalent anion, A, in said second compartment and accumulation of hydroxide ions along with the alkali metal cations M in said third compartment,
 (f) removing a solution depleted in MA but not $M_xB$ from said first compartment,
 (g) removing accumulated [HB]HA from said second compartment,
 (h) removing accumulated MOH from said third compartment.

12. A process according to claim 11, wherein said cell has a plurality of units, each unit having three compartments comprising an acid compartment defined between said monovalent anion-selective membrane and the cation-selective side of a said first bipolar membrane; a base compartment defined between said cation-selective membrane and the anion-selective side of said second bipolar membrane; and a salt compartment defined between said cation-selective and monovalent anion-selective membrane; said solution in step (b) being fed to said salt compartment, said liquid in step (c) being fed to said acid compartment, and said liquid in step (d) being fed to the base compartment, said first compartment being said salt compartment, said second compartment being said acid compartment and said third compartment being said base compartment.

13. A process according to claim 11, wherein said aqueous solution in (b) is a solution of the catch of the Electrostatic Precipitator (ESP) of a kraft pulp mill chemical recovery boiler.

14. A process according to claim 11, wherein hydrochloric acid solution is removed in step g) from said second compartment, and further including:
 A) feeding said hydrochloric acid solution to a cation-exchange column in the sodium ion form resulting in a regenerated column in the hydrogen ion form and a sodium chloride solution,
 B) feeding said sodium chloride solution into a sodium chlorate plant for the production of a sodium chlorate solution,
 C) feeding said sodium chlorate solution back into the cation-exchange column, in a separate step from A), for the production of a solution mainly composed of chloric acid,
 D) feeding said chloric acid solution into a chlorine dioxide generator for the production of chlorine dioxide,
 E) feeding chlorine dioxide to one or more chemical pulp bleaching stages for the production of bleached kraft pulps and chlorinated bleaching effluents,
 F) feeding said chlorinated bleaching effluents to a recovery system of a mill for conversion to carbon dioxide, water and sodium chloride,
 G) directing said sodium chloride to the ESP of a chemical recovery boiler where it is captured along with sodium sulphate in a solid form;
 H) dissolving the sodium chloride/sodium sulphate solid mixture from G) in water, pretreating and feeding the resulting solution to step b) to a three-compartment water splitting stack for the production of a sodium sulphate solution, partially or fully depleted in chloride and potassium; sodium/potassium hydroxide; and hydrochloric acid which is directed to step A).

15. A single stage electrodialysis process according to claim 1, comprising:
 (a) providing a cell comprising an anode, a cathode and at least two compartments therebetween defined at least in part by a monovalent anion-selective membrane and at least a pair of cation-selective membranes;
 (b) feeding an aqueous solution of a mixture of salts MA and $M_xB$ of monovalent and polyvalent anions, wherein M is an alkali metal cation, A is a monovalent chloride anion and B is a multivalent anion having a valency x, into a first of said compartments to contact a first side of said monovalent anion-selective membrane; said solution being substantially free of polyvalent metal ions;

(c) feeding liquid comprising water into a second of said compartments to contact the other side of said monovalent anion-selective membranes, (d) passing a direct current through said cell between the anode and cathode to effect:
  (i) migration of said monovalent anions A from said first compartment through said monovalent anion-selective membrane into said second compartment, and
  (ii) migration of said alkali metal cations, M from said first compartment to said second compartment, (e) removing accumulated MA from said second compartment, and (f) removing remaining $M_xB$ from said first compartment.

16. A process according to claim 15, wherein said aqueous solution in (b) is an Electrostatic Precipitator (ESP) catch solution, of a kraft pulp mill recovery boiler.

17. A process according to claim 16, wherein said ESP solution contains at least one alkali metal cation selected from sodium and potassium ions; chloride ions and sulphate ions.

18. A process according to claim 15, wherein M is $Na^+$ such that sodium chloride is removed from said second compartment in step e) and further including:

A) feeding said sodium chloride into a sodium chlorate plant for the production of a sodium chlorate solution, B) feeding sodium chlorate solution to an electrolysis cell for the production of sodium hydroxide and chloric acid, exploiting the sodium hydroxide in B) in a bleaching step, C) feeding said chloric acid solution into a chlorine dioxide generator for the production of chlorine dioxide, D) feeding said chlorine dioxide to one or more chemical pulp bleaching stages for the production of bleached kraft pulps and chlorinated bleaching effluents, E) feeding said chlorinated bleaching effluents back to the recovery system of the mill for their conversion to carbon dioxide, water and sodium chloride, F) directing said sodium chloride from E) to the ESP of a chemical recovery boiler where it is captured along with sodium sulphate in a solid form, G) dissolving the sodium chloride/sodium sulphate solid mixture in water, pretreating and feeding to an electrodialysis stack for the production of a sodium sulphate solution, partially or fully depleted in chloride and potassium, and sodium chloride solution and directing this sodium chloride solution to step A) above.

19. A single stage electrodialysis process according to claim 1, comprising:

(a) providing a cell comprising an anode, a cathode and at least two compartments therebetween defined at least in part by a monovalent anion-selective membrane and first and second cation-selective membranes;

(b) feeding an aqueous solution of a mixture of salts MA and $M_xB$ of monovalent and polyvalent anions, wherein M is an alkali metal cation, A is a monovalent chloride anion, B is a multivalent anion and x is the valency of the polyvalent anion, into a first of said compartments to contact first side of said monovalent anion-selective membrane and first side of said first cation-selective membrane; said solution being substantially free of polyvalent metal ions;

(c) feeding liquid comprising water into a second of said compartments to contact a second side of said monovalent anion-selective membrane and a second side of said cation-selective membrane, (d) passing a direct current through said cell between the anode and cathode to effect:
  (i) migration of said monovalent anions A from said first compartment through said monovalent anion-selective membrane into said second compartment, and
  (ii) migration of said alkali metal cations M from said first compartment through said first cation-selective membrane into said second compartment, (e) removing a solution depleted in MA but not $M_xB$ from said first compartment, (f) removing accumulated MA from said second compartment.

20. A process according to claim 19, wherein said cell has a plurality of units, each unit having two compartments comprising a first compartment defined between a first side of said monovalent anion-selective membrane and a first side of a first cation-selective membrane, and a second compartment defined between a second side of said monovalent anion-selective membrane and the second side of a second cation-selective membrane; said solution in step (b) being fed to said first compartment and said liquid in step (c) being fed to said second compartment, said first compartment being said diluting compartment and said second compartment being said concentrating compartment.

21. A process according to claim 1, wherein said direct current is at a current density of 10 mA/cm² to 150 mA/cm².

22. A single stage electrodialysis process comprising:

(a) providing a cell comprising an anode, a cathode and at least two compartments there-between defined at least in part by a monovalent anion-selective membrane and a pair of bipolar membranes, said bipolar membranes having a cation-selective side facing said cathode and an anion-selective side facing said anode, (b) feeding an aqueous solution of a mixture of alkali metal salts MA and $M_xB$ of monovalent and polyvalent anions into a first of said compartments to contact a first side of said anion-selective membrane, and the anion-selective side of a first of said bipolar membranes, wherein M is an alkali metal cation, A is a monovalent chloride anion and B is a multivalent anion having a valency x, said solution being substantially free of polyvalent metal ions, (c) feeding liquid comprising water into a second of said compartments to contact an anion-selective side of a first of said bipolar membranes, (d) passing a direct current through said cell between the anode and cathode to effect:
  (i) migration of said monovalent chloride anions A from said first compartment through said monovalent anion-selective membrane into said second compartment, and
  (ii) splitting of water by said bipolar membrane of said second compartment with accumulation of hydrogen ions along with the monovalent anions A, in said second compartment and accumulation of hydroxide ions in said first compartment, (e) removing accumulated HA from said second compartment, and (f) removing accumulated MOH from said first compartment.

23. A process according to claim 22, wherein said aqueous solution in (b) is an Electrostatic Precipitator (ESP) catch solution of a kraft pulp mill recovery boiler.

24. A process according to claim 23, wherein said ESP solution contains at least one alkali metal cation selected from sodium and potassium ions, chloride ions and sulphate ions.

25. A process according to claim 23, wherein said cell is a two-compartment cell comprising an acid compartment defined between said monovalent anion-selective membrane and the cation-selective side of a said first bipolar membrane; and a salt/base compartment defined between said anion-selective side of a second of said bipolar membranes and said monovalent anion-selective membrane; said solution in step (b) being fed to said salt/base compartment, said liquid in step (c) being fed to said acid compartment, said first compartment being said salt/base compartment and said second compartment being said acid compartment.

26. A process according to claim 25, wherein said passing of said direct current in step (d) further causes splitting of water by said bipolar membrane with migration of hydroxide ions from split water to said first compartment, and migration of hydrogen ions from said split water to said second compartment.

27. A process according to claim 22, wherein said cell has a plurality of units- each unit having two compartments comprising an acid compartment defined between said monovalent anion-selective membrane and the cation-selective side of a said first bipolar membrane; and a salt/base compartment defined between said anion-selective side of a second of said bipolar membranes and said monovalent anion-selective membrane; said solution in step (b) being fed to said salt/base compartment, said liquid in step (c) being fed to said acid compartment, said first compartment being said salt/base compartment and said second compartment being said acid compartment.

28. A process according to claim 22, said direct current is at a current density of about 25 to 250 mA/cm$^2$.

29. A single stage electrodialysis process which comprises the steps:

(a) feeding a solution containing a mixture of salts of polyvalent anions and monovalent chloride anions into a three-compartment water splitter composed of alternate bipolar, monovalent anion-selective, cation-selective and bipolar membranes, the said solution being introduced into a salt compartment between the cation-selective membrane and the monovalent anion-selective membrane, the said solution being substantially free of polyvalent metal ions, (b) feeding water into a base compartment, between the cation-selective membrane and an anion-selective side of a first said bipolar membrane, (c) feeding water into an acid compartment, between the monovalent anion-selective membrane and a cation-selective side of a second said bipolar membrane, (d) passing a direct current through said water splitter thereby causing the transfer of salt cations from said salt solution to said base compartment causing basification of water in said base compartment, and in addition causing the transfer of monovalent chloride anions to the acid compartment thereby causing the formation of acid of the monovalent chloride anion, (e) bleeding from said salt compartment a solution that is depleted in said monovalent chloride anions, (f) bleeding from said base compartment a liquid comprising aqueous hydroxide of said salt cations, (g) bleeding from said acid compartment a solution rich in acid of the monovalent chloride anions.

30. A process of claim 29, wherein said solution in step a) is an Electrostatic Precipitator (ESP) catch solution.

* * * * *